United States Patent
Schindler

(10) Patent No.: US 12,024,103 B2
(45) Date of Patent: Jul. 2, 2024

(54) MANAGEMENT SYSTEM AND METHOD FOR IDENTIFICATION AND BIOMONITORING IN VEHICLES

(71) Applicant: Hermann Schindler, Niederlauterbach (FR)

(72) Inventor: Hermann Schindler, Niederlauterbach (FR)

( * ) Notice: Subject to any disclaimer, the term of this patent is extended or adjusted under 35 U.S.C. 154(b) by 64 days.

(21) Appl. No.: 17/640,270

(22) PCT Filed: Sep. 2, 2020

(86) PCT No.: PCT/EP2020/074483
§ 371 (c)(1),
(2) Date: Mar. 3, 2022

(87) PCT Pub. No.: WO2021/043834
PCT Pub. Date: Mar. 11, 2021

(65) Prior Publication Data
US 2022/0332265 A1      Oct. 20, 2022

(30) Foreign Application Priority Data
Sep. 6, 2019   (EP) ..................................... 19195986

(51) Int. Cl.
*B60R 16/037*   (2006.01)
*G06F 21/32*    (2013.01)

(52) U.S. Cl.
CPC ............ *B60R 16/037* (2013.01); *G06F 21/32* (2013.01)

(58) Field of Classification Search
CPC .............................. B60R 16/037; G06F 21/32
See application file for complete search history.

(56) References Cited

U.S. PATENT DOCUMENTS

| | | | |
|---|---|---|---|
| 7,027,621 B1* | 4/2006 | Prokoski | G06V 40/165 |
| | | | 340/576 |
| 9,104,537 B1* | 8/2015 | Penilla | G06Q 10/20 |
| 9,493,130 B2 | 11/2016 | Penilla et al. | |
| 10,317,897 B1 | 6/2019 | Kentley-Klay et al. | |
| 2015/0016714 A1 | 1/2015 | Chui | |
| 2015/0061895 A1 | 3/2015 | Ricci | |
| 2017/0153636 A1 | 6/2017 | Boesen | |
| 2018/0208204 A1 | 7/2018 | Chen | |
| 2019/0061691 A1* | 2/2019 | Farges | B60R 25/255 |

FOREIGN PATENT DOCUMENTS

| | | |
|---|---|---|
| CN | 108146310 A | 6/2018 |
| DE | 10 2006 052 576 A1 | 5/2008 |
| EP | 2 871 866 A1 | 5/2015 |
| EP | 3 000 396 A1 | 3/2016 |

\* cited by examiner

*Primary Examiner* — Russell Frejd
*Assistant Examiner* — Ana D Thomas
(74) *Attorney, Agent, or Firm* — Christensen, Fonder, Dardi & Herbert PLLC

(57) ABSTRACT

A management system for identifying and bio-monitoring at least one user of a vehicle. An associated personal module is configured to access personal data of a user and thereby identify the user. The management system includes: a vehicle-related module configured to access at least one vehicle component; and a communication module configured to enable an exchange of data between the personal module and the vehicle-related module, even when the personal module is outside the vehicle. The vehicle-related module is configured to make or allow at least one change to the at least one vehicle component based on the exchanged data.

19 Claims, 12 Drawing Sheets

MANAGEMENT SYSTEM AND METHOD FOR IDENTIFICATION AND BIOMONITORING IN VEHICLES

PRIORITY CLAIM

The present application is a National Phase entry of PCT Application No. PCT/EP2020/074483, filed Sep. 2, 2020, which claims priority from European Patent Application No. 19195986.5, filed Sep. 6, 2019, the disclosures of which are hereby incorporated by reference herein in their entirety.

FIELD OF THE INVENTION

The present invention relates to management system and methods for identification and bio-monitoring in vehicles. More particularly, the invention relates to an identity and bio-management system in vehicles and other means of transportation such as aircraft and helicopters.

BACKGROUND

With the increasing performance of mobile devices, new areas of application are emerging that were previously unthinkable. Large areas of application include for example bio-monitoring. For example, newer wearable devices such as smartphones, smartwatches, and fitness wristbands enable permanent monitoring of the wearer's health.

Such monitoring has been used largely independent of the specific environment. On the other hand, health problems often occur in specific environments.

Back pain, for example, can be a problem. The causes are varied and range from sitting incorrectly or for too long, stress, lack of exercise, one-sided sitting or standing, to incorrect seats or poor, non-individualized seat settings. In particular, sitting in vehicles such as cars, trucks or airplanes causes one-sided stress. These are significantly increased by long driving times. Stressful situations while driving can increase the pain even more.

There are seats for vehicles that automatically adjust to the preferred seat position. For example, there are various keys with radio remote control assigned to the respective person for this purpose. When a person opens the door with the respective key, the seat is automatically moved to a predefined seat position. However, this seat position is not determined and set for the person's individual needs; instead, the person selects it as a preset according to feeling.

There are also conventional seats with massage functions to prevent or alleviate back pain, etc. DE 10 2006 052 576 B4 and CN 108 146 310 A, for example, disclose a massage system that reacts to road conditions and adjusts the massage function accordingly. In addition, U.S. Pat. No. 9,493,130 B2 discloses a "connected vehicle" in which a user's emotional state is detected in a voice input device. US2015/016714 discloses a wearable device that detects when it is in a vehicle. It can also detect the user's drowsiness, and it can provide an alert via a Bluetooth connection in the vehicle's speaker. Other conventional sensor and analysis systems are disclosed in EP 3 000 396 B1, which could provide information about the fatigue state of the legs or back, biomechanical features due to body build, etc.

However, there is still a need for an integrated system that provides secured fitness and bio-management solutions in the vehicle with high technical performance and energy efficiency.

SUMMARY OF THE INVENTION

At least a part of the above mentioned problems is solved by a management system according to claim 1, to a system according to claim 12, and to a method according to claim 17. The dependent claims define further advantageous embodiments for the objects of the independent claims.

The present invention relates to a management system for identification and bio-monitoring of at least one user of a vehicle having a personal module configured to access personal data of the user and thereby identify the user. The management system comprises: a vehicle-related module and a communication module. The vehicle-related module is configured to access at least one vehicle component. The communication module is configured to enable an exchange of data between the personal module and the vehicle-related module, even when the personal module is outside the vehicle. The vehicle-related module is further configured to make or allow at least one change to the at least one vehicle component based on the exchanged data.

The term "vehicle-related" refers to an affiliation with the vehicle, i.e. it can be installed in or on the vehicle, in particular it can also be installed in a control unit of the vehicle. However, it may also have its own data processing unit. The term "vehicle" is to be interpreted broadly, i.e. to include air, water or land vehicles—as long as they are suitable for transporting persons. It is understood that the personal module need not be part of the management system. It is important that an exchange of data is possible.

According to further embodiments, the vehicle includes one or more sensors capable of detecting a condition or movement of the user in the vehicle. The vehicle-related module may then be further configured to access the one or more sensors to obtain and process information about the condition or movement of the user to determine at least one of the following:
  a use of a particular seat,
  an adjustment of the seat,
  a change in the state of fitness,
  a health deterioration,
  a fatigue,
  a confirmation of a result obtained elsewhere (e.g., an identification can be confirmed).

According to further embodiments, the management system further comprises an analysis unit or is designed to access an external analysis unit in the vehicle or on the mobile device or an external server (e.g. cloud-based), for example to aggregate and analyze user-related data. This analysis can be performed, for example, with regard to the user's condition (e.g., health or fitness status). The communication module can be designed in particular to transmit data to the external analysis unit via a secure gateway.

According to further embodiments, the vehicle-related module may be fixedly connected to the vehicle and may in particular be part of a control unit. The at least one vehicle component may comprise or be a part of one or more of the following:
  a door opener,
  an ignition,
  an image display device (e.g. a screen, projection module (head-up display), an "augmented reality" window, for example on the windshield),
  an acceleration control of the vehicle,
  a braking system of the vehicle
  a communication, navigation or entertainment system,
  a seat adjustment module,
  a steering wheel adjustment module,
  a mirror adjustment module,
  a temperature control module,
  a massage unit.

According to further embodiments, the vehicle-related module is configured to provide an authentication signal to the vehicle to allow access to the vehicle component or to the entire vehicle only when the user has been identified or when the user is on an assigned place.

According to further embodiments, the vehicle-related module stores user-specific data only during a communication or an inter-connection with the personal module. After a predetermined period of time following the end of the communication, this data can be deleted.

According to further embodiments, the vehicle-related module is further configured to communicate with a plurality of personal modules and to make functions of the vehicle accessible. Communication can occur simultaneously (e.g., multiple occupants in a vehicle have corresponding personal modules) or sequentially—for example, when multiple drivers share a vehicle (e.g., rental cars, car sharing, etc.).

Optionally, the personal module is configured to store a data algorithm learning instrument. The vehicle-related module may be a secured gateway in the vehicle and is configured to receive the data algorithm learning instrument from the personal module (only) temporarily in order to implement at least one of the following in the vehicle-related module:
Capture user-related data during a journey,
Hypothesize and correlate user state changes with vehicle controls made,
Testing of previously established hypotheses, related to at least one other user and stored in the data algorithm learning instrument, on the user of the vehicle,
Periodically transfer the hypotheses and/or data algorithm learning instrument to the person-centered module,
Deleting all data and the data algorithm learning instrument from the gateway when the user leaves the vehicle.

Optionally, the vehicle is an electric vehicle. The vehicle-related module may then be configured to perform an optimization with respect to an energy consumption based on a cost function. The optimization may be performed based on at least one of the following parameters:
energy consumption of a processor,
of a measured and/or indirectly determined volume of data used in the data algorithm learning instrument,
a distance to be driven,
positive or negative cost parameters (e.g., in the form of tokens) for past burdens or conservation of resources.
The tokens can be stored centrally and relate to specific vehicles, but they can also relate to people.

Embodiments also refer to a vehicle having a management system as previously defined.

According to further embodiments, the vehicle comprises at least one of the following sensors as data source(s) for the management system:
one or more cameras,
an optical sensor (e.g. laser sensor or optical tracking device),
a photoelectric sensor,
at least one pressure sensor in a vehicle seat,
a thermometer,
at least one motion detection sensor,
an ultrasonic sensor,
a vibration sensor,
an infrared sensor,
a microphone,
a device for measuring bio-data, in particular an EEG/ECG,
a force sensor (e.g. on a pedal for brake, gas, etc.),
an acceleration sensor,
a moisture meter,
a conductivity measuring device.

Embodiments also relate to a system for identifying and bio-monitoring at least one user of a vehicle. The system comprises: a personal module configured to access personal data of the user and thereby identify the user, and a management system as previously defined.

According to further embodiments, the personal module is a portable/mobile device or a part thereof. For example, the personal module may be formed on a mobile device, e.g., in the form of an app. The mobile device may be a smartphone, a tablet, a fitness bracelet, a smartwatch, etc. The personal data may include at least one of the following:
a password,
a fingerprint,
an image,
an eye iris scan,
a characteristic cardiac activity,
a heart rate,
a component or characteristic of the blood,
Movement profile,
Driving behavior,
Behavior while sitting,
Behavior during movements (e.g. running),
Usage patterns of portable electronic devices (smart phones, tablets, etc.) and social media accounts,
a temperature,
a location information.

According to further embodiments, the personal module is configured to collect health-specific data of the user and to provide information about potential health deteriorations that may affect driving ability as data for exchange.

According to further embodiments, the communication module is configured to use at least one of the following protocols: Bluetooth, ANT+, NFC, WiFi, or any other commonly used protocol. It is understood that the invention is not intended to be necessarily limited to any particular protocol—any suitable standard may be used. The communication module may be further configured to monitor communication and detect and/or prevent unauthorized intrusion by a third party.

Optionally, the personal module is configured to pass the data algorithm learning instrument to a cloud or central server to enable at least one of the following:
a centralized further development of used data algorithms,
Generating new hypotheses,
Aggregation of data,
Completing partial analysis performed by the vehicle-related module and/or by the personal module.
It is understood that the cloud or central server is appropriately designed to provide these functions.

Embodiments also relate to a method for identification and bio-monitoring in vehicles. The method comprises the steps of:
Capture, through a personal module, of a user's personal data;
Identify the user based on the personal data collected;
Control, by a vehicle-related module, of at least one vehicle component;
Exchanging data between the personal module and the in-vehicle module, regardless whether the user is inside or outside the vehicle; and
Performing changes, by the vehicle-related module, to the at least one vehicle component based on the exchanged data.

According to further embodiments, all previously described functions of the mentioned systems are implemented as further optional steps in the method. The sequence of the steps can also be selected as desired.

This method, or at least parts thereof, may also be implemented or stored in the form of instructions in software or on a computer program product, stored instructions being capable of executing the steps according to the method when the method is running on a processor. Therefore, the present invention also relates to computer program product having software code (software instructions) stored thereon that is configured to perform any of the previously described methods when the software code is executed by a processing unit. The processing unit may be any form of computer or control unit having a corresponding microprocessor capable of executing software code.

In particular, according to embodiment examples, each of said modules may be implemented in software or may have a correspondingly programmed control or processing unit in the vehicle.

According to further embodiments, in particular, a cloud connection is made, downloads from app stores are made possible, and the software in the vehicles can be renewed on a weekly/daily basis (updates).

Compared to conventional systems, advantages of embodiments are thus based on a bio-data collection device or a personal fitness system (wearable device) that is simultaneously used for reliable identification or authentication in the vehicle area. For a customization of the vehicle to the individual needs of the user, an exchange of information between the vehicle and the personal fitness system of the user outside the vehicle is used, whereby no complete exchange of raw data is required, but only processed information and this only to the extent necessary for this purpose is advantageously exchanged between the personal fitness system of the user and the bio-management system in the car.

Unlike conventional systems, the behavioral or movement pattern while sitting can be detected and the car (vehicle) can be adjusted accordingly to meet the needs. Therefore, the following embodiments relate less to a fitness system and more to a bio-management system or simply management system in the vehicle. While conventional fitness trackers can analyze the normal daily routine sufficiently well, sleep trackers can do so for the time of sleep. However, unlike the embodiments in this invention, these mobile devices do not provide a technically capable solution for sitting in vehicles.

The data obtained in the car according to embodiment examples is also important for applications in fitness and sleep trackers and can significantly expand the database of fitness systems outside the vehicle. By integrating the data from the in-car management system into the fitness systems outside the vehicle, a complete picture of the individual's daily routine and situation is obtained.

Although conventional systems can record information about the fatigue state in the legs and back with a sensor system, the information must be entered there manually for the respective seat in an input unit. However, if the person sits in a different seat the next time, new entries are required or at least the assignment of the person to the new seat must be changed. Instead, the above-mentioned embodiments make it possible to permanently take into account fatigue states of the body. After a marathon run, a different seat position is useful than after a day of sedentary work.

Finally, the embodiments allow new mobility services such as ride-sharing platforms and car-sharing etc. to be used without having to share personal data on a large scale.

As a result, people can drive very many different cars and change cars more often or sit in different vehicles and do not have to sacrifice either the comfort they are used to or the protection of personal data.

BRIEF DESCRIPTION OF THE DRAWINGS

The embodiments of the present invention will be better understood with reference to the following detailed description and accompanying drawings of the various embodiments, which, however, should not be construed as limiting the disclosure to the specific embodiments, but are for explanation and understanding only.

DETAILED DESCRIPTION

Figure 1A:
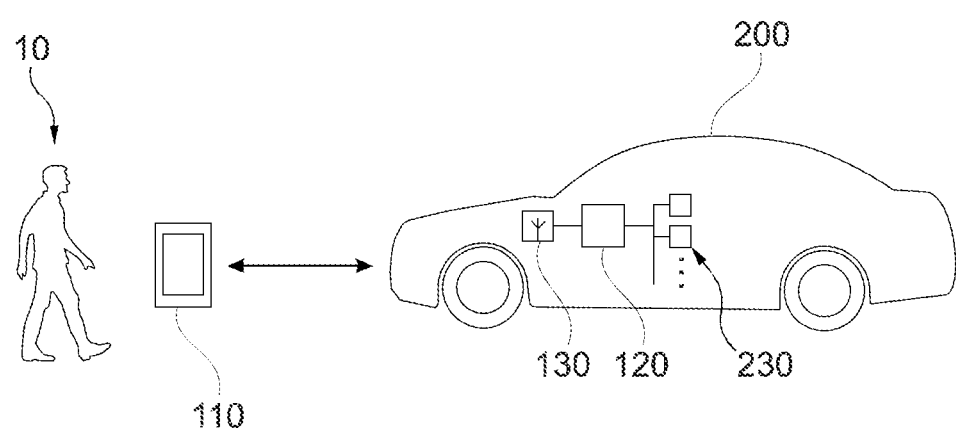
FIG. 1A shows a management system for identification and bio-monitoring in vehicles according to an embodiment of the present invention.

FIG. 1A shows a management system for identification and bio-monitoring in vehicles 200. The bio-monitoring relates to a user 10 with a personal module 110. The management system comprises a vehicle-related module 120 and a communication module 130. The personal module 110 is configured to access personal data of a user 10 and thereby identify the user 10. The vehicle-related module 120 is configured to access at least one vehicle component 230. The communication module 130 is configured to enable an exchange of data between the personal module 110 and the vehicle-related module 120, even when the personal module 110 is outside the vehicle 200. The vehicle-related module 120 is further configured to make or allow at least one change to, or enable or block functions of, the at least one vehicle component 230 based on the exchanged data.

Vehicle 200 is intended to include not only a car or truck, but to include any vehicle capable of transporting people, that means any form of land, air, or sea vehicle.

For example, the vehicle-related module 120 may be fixedly connected to the vehicle 200 respectively may be configured as part of a control unit. The vehicle component 230 can be almost any component of the vehicle 200 that can be controlled by the vehicle-related module 120. Examples include: a door opener, an ignition, an image display device (e.g., a screen, projection module, or "augmented reality" window), a vehicle acceleration control system, a vehicle braking system, a communication, navigation, or entertainment system, a seat adjustment module, a steering wheel adjustment module, a mirror adjustment module, a temperature control module (e.g., in the seat or air conditioning system), a massage unit, or portions thereof.

Figure 1B:
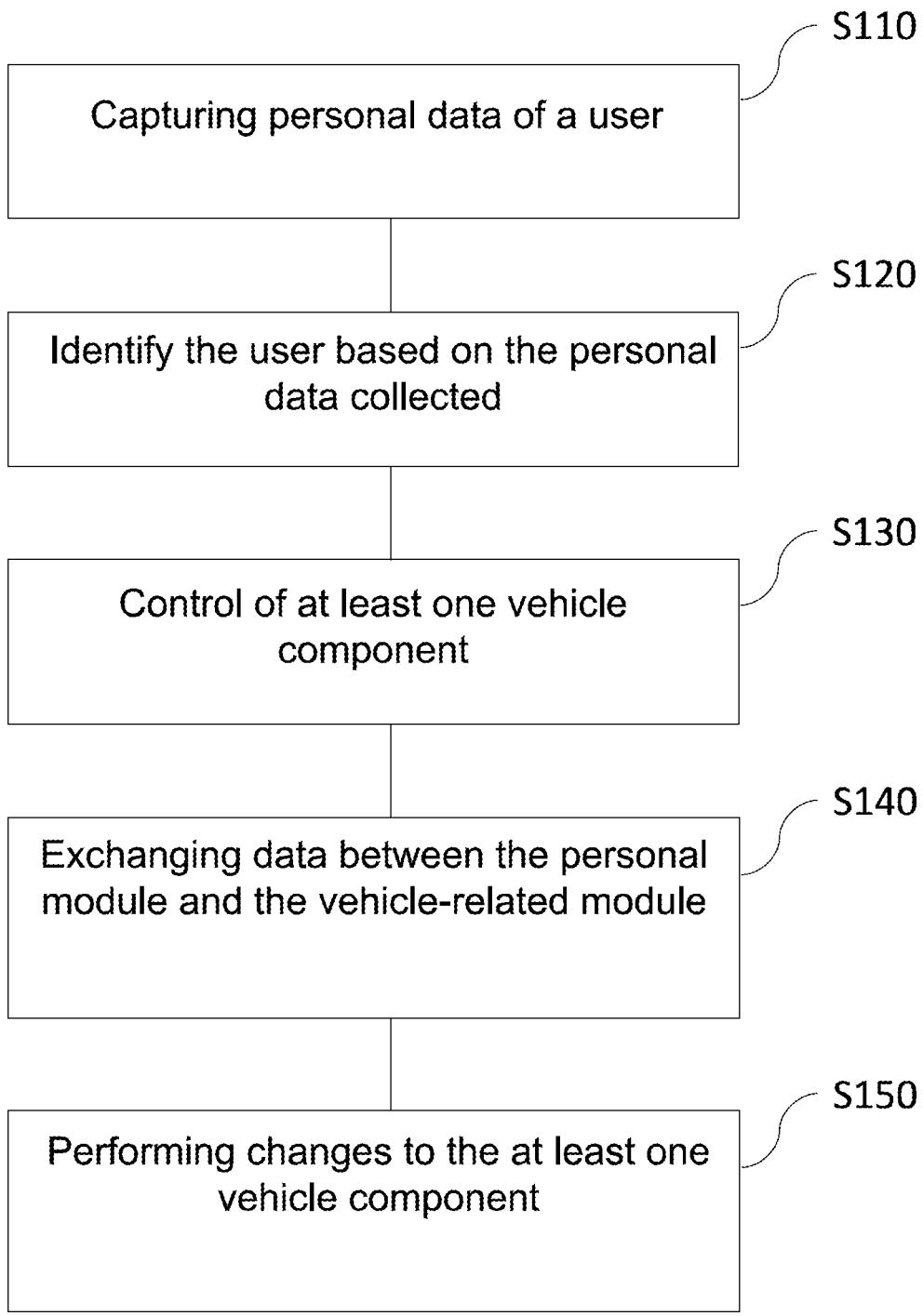
FIG. 1B shows a flowchart of a method for identification and bio-monitoring according to a further embodiment.

FIG. 1B shows a flowchart for a method for identification and bio-monitoring in vehicles according to another embodiment. The method comprises:

Capturing S110, by a personal module 110, personal data of a user 10;
Identify S120, the user 10 based on the personal data collected;
Control S130, by a vehicle-related module 120, of at least one vehicle component 230;
Exchanging S140 data between the personal module 110 and the vehicle-related module 120, whether the user 10 is in the vehicle 200 or outside; and
Performing S150 changes, by the vehicle-related module 120, to the at least one vehicle component 230 based on the exchanged data.

It is understood that all functions described in connection with the management system from FIG. 1A can also be implemented in the method as further optional steps.

The method may also be computer-implemented, that means implemented by instructions stored on a storage medium and capable of executing the steps of the method when run on a processor. The instructions typically comprise one or more instructions that may be stored in different ways on different media in or peripheral to a control unit (having a processor) that, when read and executed by the control unit, cause the control unit to perform functions, functionalities, and operations necessary to perform a method according to the present invention.

Figure 2:
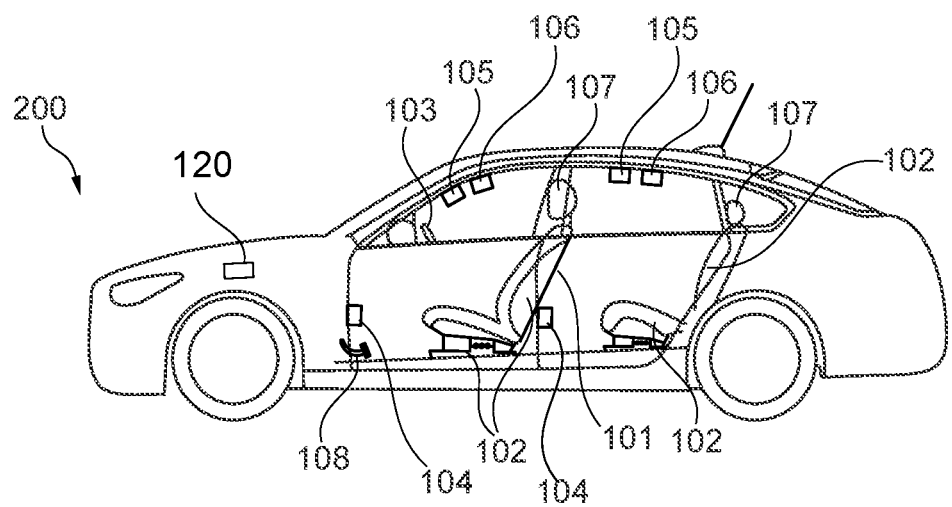
FIG. 2 shows the basic structure of the vehicle-related module according to an embodiment.

FIG. 2 shows the basic structure of the vehicle-related module 120, which is present as a bio-management system in the vehicle 200 and which may be integrated, by way of example, in one of the screen units of the entertainment and navigation system as an application and with an input and output unit in the rear. Various sensors and instruments or furniture and fixtures that can be adapted to the individual situation of the respective person 10 are exemplarily shown.

For example, the vehicle 200 includes at least one car seat 101 that is adjustable with respect to many areas such as height, width, length, inclinations, seat cushion hardness, padding and supports, temperator, massage function, etc. The seat 101 may include various sensors 102, such as one or more of the following: Pressure sensors, temperature sensors, heart rate sensors, humidity sensors, conductivity sensors (sweating, stress, etc.). The steering wheel 103 of the vehicle 200 may be adjustable and likewise include various sensors such as in the seats, as well as sensors for analyzing steering activity. The vehicle 200 further comprises a pedal 108 (e.g., brake pedal, accelerator pedal) with sensors for sensing pressure, behavior, and foot position.

In addition, various cameras or infrared, ultrasonic, motion trackers may be present, for example, in the footwell (sensor 104) or in the head area (sensor 105) or above the head to detect movements, eye movements, upper body movements. In addition, microphone(s) 106 may be present.

Furthermore, sensors 107 may be present in headrests, which may have, for example, a so-called EEG for measuring brain waves. Thus, brain activity can be measured. In combination with other recorded data—in particular heart rate variability, ECG, behavior while sitting—valuable information can be calculated and derived from this. However, the sensors 107 can also be designed to measure a distance between the head and the neck support. For this purpose, for example, so-called ultrasonic sensors can be used (which also transmit ultrasound). In this way, the posture of the head can be determined. This is particularly advantageous in the event of sudden health problems or the driver falling asleep or a so-called sagging of the head.

A car 200 is shown as an example. However, it can also be other vehicles or means of transport such as boats or aircraft. In the following, cars will be referred to as vehicles for simplification. It is important to note that in the vehicle 200 not only sensors 102, 103, 104, . . . gather data, but that the vehicle-related module 120 is designed to adapt vehicle components 230 such as seats 101, steering wheel 103, mirrors, etc. based thereon.

Figure 3:
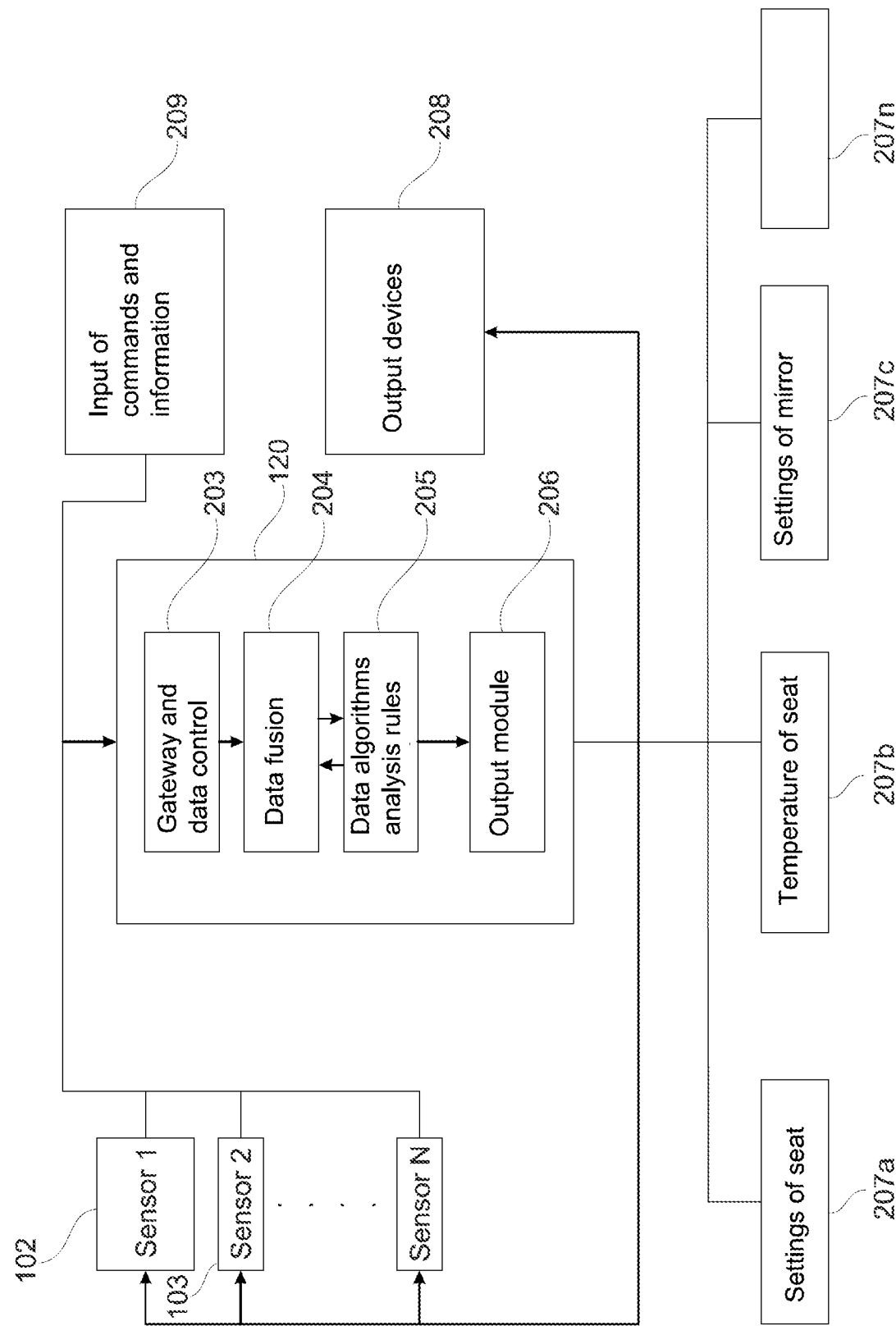
FIG. 3 illustrates a process of data acquisition and data analysis of the vehicle-related module according to an embodiment example.

FIG. 3 further illustrates this process. The data from the various sensors 102, 103, . . . may be retrieved from the vehicle-related module 120 and enter the vehicle-related module 120 via a gateway and data control module 203. The gateway/data control module 203 may also include technology to protect against (and prevent) unwanted access or false data and, in a specific embodiment, may also include a so-called "Ethernet Switch" (e.g., in accordance with IEEE standards such as 100Base-T1). However, it may also be physically implemented in this Ethernet switch as a sub-module.

For example, the analysis of the data for the car seat 101 is already very important and can take place directly in the car seat 101. For this purpose, a corresponding processing unit may be provided in the car seat 101 to perform a pre-analysis of the data. It is also possible that the system 120 is located in the car seat 101. This is particularly advantageous, if only the data of the car seat 101 is included for bio-monitoring. In many cases, however, it is useful to bring together data from the various sensors 102, 103, . . . in the car 200 in a data pool and to gain new insights and information through a joint analysis. For this purpose, the data analysis algorithms and data algorithms learning instruments known from the field of artificial intelligence and presented further below in this invention can be used.

For example, the vehicle-related module 120 can gather and analyze data from pressure sensors 102 in the car seat 101 and from cameras 104, 105. During the analysis, in particular the behavior in the seat and the stress on skeleton and musculature can be determined. In addition, the pressure sensors 102 can be supplemented by other sensors, in particular temperature sensors or cameras for filming the behavior of the user can be used. The joint analysis obtained in this way significantly increases the measurement accuracy. By comparing and merging the data, it can also be checked and complemented. The causes of deviations or changes can be determined.

As a rule, the time until accurate data is available is also reduced, since many sensors work with filter mechanisms and frequently occurring measurement errors must be eliminated via the formation of time series. By combining different sensors and data sources, embodiments can avoid or shorten a time series comparison. This makes it possible to obtain and process information in real time or near real time ("near real time").

To achieve this purpose, according to further embodiments, the vehicle-related module 120 may comprise a data fusion and analysis module 204. Data algorithms and analysis rules 205, which may be stored in a corresponding memory, are used for data analysis. Based on the data analysis, a corresponding information for adapting the behavior to the user can be output by an output module 206. The output may be on a screen or other output medium 208 such as a speaker, head-up display, or augmented reality windshield. However, various settings in the car 200 such as a seat tilt/adjustment 207*a*, a temperature of the seat 207*b*, mirror adjustment 207*c*, etc. may also be changed.

Optionally, the vehicle-related module 120 also allows input from the user via a corresponding input module 209, via which the user can, for example, provide confirmations or cancel changes to be made.

However, the data algorithms and analysis rules 205 used are continuously developed as part of the data analysis 204 process, and methods and instruments commonly used by the skilled person in the field of machine learning and artificial intelligence may be used.

According to further embodiments, the vehicle-related module 120 protects the data, information, and commands against unintentional tampering. For example, a threat could be that the seat—in particular of the driver—is adjusted by or via one or more sensors while driving and the driver is distracted, which poses a safety risk. Centralized data control in the vehicle-related module 120 saves energy and is faster.

According to further embodiments, the vehicle-related module 120 may therefore include security mechanisms in the data control gateway/module 203 that include one or more of the following: encryption, validation identification code exchange between sensors, etc.

According to further embodiments, security is further enhanced by incorporating specific security mechanisms into the analysis rules 205 in addition to known security technologies. Examples include:

1. The body height of the user 10 is stored in the system and certain bio-mechanical conditions such as leg length, arm length and corresponding levers at the elbow and knee are calculated from these. This is usually an approximation, but it is sufficient to define the bandwidths required in the following.
2. The seat position may only be changed within defined bandwidths. The bandwidths are defined in such a way that, for example, the driver 10 always has a good field of vision to the front and side and the actuating elements (brake, accelerator pedal, clutch) always remain within reach.
3. Adjustments to the seat, steering wheel, mirrors, etc. are made very slowly and are coordinated with one another (change of seat and corresponding change of interior and exterior mirrors, steering wheel or control unit, projections into the windows or orientation of the screens in the vehicle, etc.).

According to further embodiments, the vehicle-related module 120 is able to adapt these security rules to the country in which the vehicle is located. One possibility for this would be that an existing GPS system, detects the country and reports it to the vehicle-related module 120, where it applies the applicable safety rules accordingly. If necessary, the hardware and/or sensors in the vehicle 200 can also be adapted accordingly. The above-mentioned safety precautions also apply here. In particular, the driver may be informed of this via the output module 206.

However, advantages of embodiments are based on the combination of the described vehicle-related module 120 in the vehicle with the personal module 110 (e.g., a personal fitness monitoring system of the user). Independent of the vehicle-related module 120, the personal module 110 can also be used as an identification system for other applications in the car.

Figure 4:
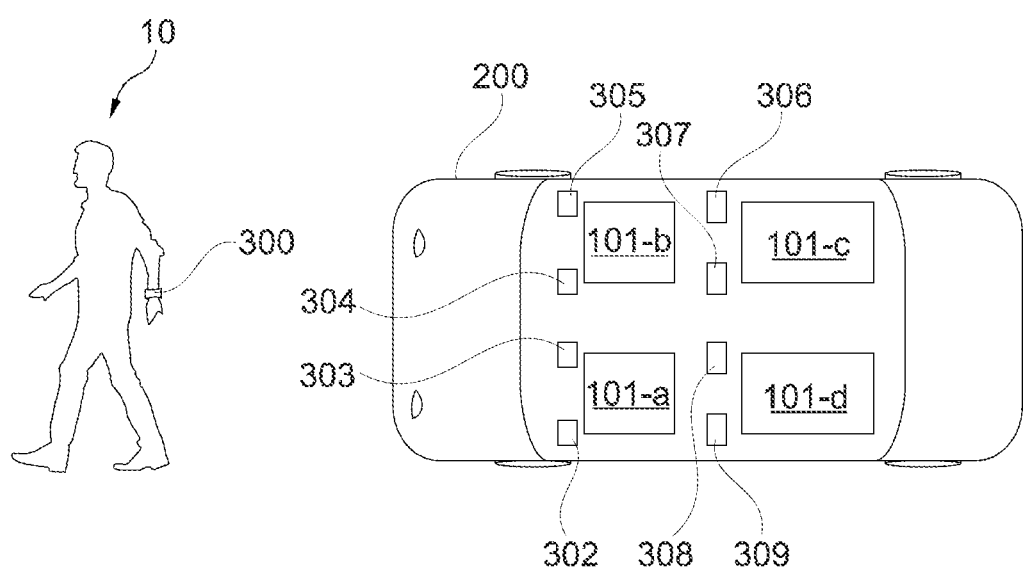
FIG. 4 illustrates the use of portable devices as an identification system for the personal module according to an embodiment example.

FIG. 4 illustrates the use of wearable devices 300, such as fitness trackers or smart watches, as an identification system for the systems of the vehicle 200 and, in particular, for the vehicle-related module 120. The wearable device 300 may include (e.g., be implemented in software) the personal module 110, wherein the personal module 110 may include the identification system.

For example, the following devices can be used as wearable electronic devices 300: Smart phone, smart watch, music player, earpiece. On these, there is information about the owner or wearer (user 10). In order to ensure that it is indeed the registered owner, the security procedures known to the skilled person can be used via entering security codes, fingerprint scanner, eye iris scan, etc. Once the wearable device 300 enters or comes in proximity to the vehicle 200 with the owner, the personal module 110 in the device 300 can automatically connect with vehicle-related module 120, again allowing for various pairing and enabling processes.

According to advantageous embodiments, an association is made between the device 300 and a specific seat 101 (driver's seat 101-*a*, front passenger 101-*b*, rear left 101-*d*, rear center 101-*c*, etc.). This can be achieved by various methods. A simple example would be proximity location using an NFC chip, etc. However, specific storage areas can also be assigned for devices such as smart phones, in-ear plugs, or smart glasses, whose activation/removal can then be detected.

FIG. 4 shows an example of such an allocation process. If the user 10 sits down in the driver's seat 101-*a* with the device 300, then the user may, for example, briefly hold the device 300 against an association sensor system 302. This may be, for example, an NFC sensor system such as is present in many fitness systems such as smart watches, smart phones. For people wearing the watch on the right side, there may be another sensor system 303 on the right side, thus the device 300 can be held very easily to the sensor 302, 303. According to embodiments, further allocation sensors 304, 305 may be present for the passenger next to the car seat 101*b*. The same can be achieved for further passengers on the rear seats 101-*c*, 101-*d* by means of existing allocation sensors 306, 307, 308, 309.

A problem arises because of the close proximity of the central allocation sensors 303, 304 (or 308, 307). However, the personal module 110 may have stored on it (or the watch may detect it using sensors such as gyroscopes; if the watch is worn on the left, the position/orientation of the watch when worn is different from when worn on the right hand; it may also detect if the watch is worn on the underside of the arm, etc.) whether the user 10 is a person wearing the watch on the right or left. The system would detect a person wearing the watch on the right as being in 101-*a* when the sensor 303 and/or the sensor 304 generates a signal. A person wearing the watch on the left would automatically assign it to 101-*b* when the center assignment sensors 303, 304 generate a signal. The same is then true for 307 and 308.

According to further embodiments, there is automatic detection that the person 10 is sitting in a specific seat. For example, sensors 102 in the car seat or on other parts of the car (sensor 103 on the steering wheel or sensor 108 on a pedal) can detect which person is sitting there. This can be done, for example, by means of an individual pattern that takes into account at least one of the following characteristics: Behavior, circumstances (e.g., weight, height), bio-data such as patterns of heartbeat at certain driving speeds or certain driving situations. Other health data that can be used include, for example, heart rate, heart rate variability, ECG, stress levels, respiratory rate, brain waves (EEG), blood pressure, body temperature and its fluctuation, blood sugar, etc.

According to embodiment examples the navigation system can for example be induced to detect whether many intersections, curves, etc. are being traversed. Since users generally react differently to these situations, this pattern can be used to identify the user 10. For example, for one type of user, heart rates go up sharply when going through intersections, curves, etc., while for another, the same situation causes little or no change in heart rates. Other individual behavioral data used in embodiments may include, for example, determining how a person sits and behaves in the car seat 101: how often they change position; do they load left/right or front/back more; do they sit upright or hunched over. The cameras 104, 105 can easily detect this.

Individual data or the combination of the various data represent a very individual means of identification (similar to a fingerprint). In this way, it can be determined not only in which seat the user 10 is sitting, but also who—from a given group of people—is in the respective seat. In case that several persons get into a vehicle (e.g., a married couple), the vehicle-related module 120 can read data such as weight, body build (for example, also a 3-D scan of the person's body), etc., from the personal module 110 and compare them with the recorded seat data and automatically assign the respective data to the seats. As a check, a short query with a display of the assigned data may still be performed on an output device 208 (e.g., an in-board screen) of the vehicle to ensure that the assignment is correct.

Embodiments may improve the prediction quality of the mapping by at least one of the following:

Not only can the user's weight data be sent from the personal module 110 to the vehicle-related module 120, but optionally a 3D scan of the body of the user 10 can also be sent. The pressure sensors 102 in the car seat compare this to the sent data and confirm identity if it matches. The 3D scan of the user 10 may be captured by a 3D camera of the type increasingly used for individualized garments in the apparel industry. These 3D scans, in many cases taken in a standing posture, can be converted into seated 3D patterns via algorithms. Length and width of the thighs, shape of the gluteal muscles provide basic data. From the data of the upper body, this basic data can be further refined. These data can be used, for example, to determine how the person will sit (e.g., what pressure profile will be generated on the seat). Thus, this data can be used to define normal values against which, the monitoring system matches the sensor data. These are approximations, which in combination allow a reliable statement. These methods are known from the field of artificial intelligence.

When matching the 3D scan with the imprint of the pressure sensors 102 in the car seat 101, a match can be calculated. The prediction probability is higher by this method than if only the body weight is used.

An even higher probability is achieved as follows: a user sits in a seat 101 equipped with pressure sensors 102. A profile of the pressure distribution is then generated. Since such profiles of pressure distribution when sitting in a vehicle seat 101 differ greatly between individuals, this method can either complement or replace other identity verification methods.

Another way to capture the assignment of people to the various seats 101 is to have cameras 104, 105 inside the car pointed at the seats. The images of the persons captured by the cameras 104, 105 at the respective seat positions are compared with the images stored on the mobile device 300 and the associated security applications. According to embodiments, the personal module 110 has access thereto.

This automatic detection system of seat assignment in vehicles can also be used—independently of fitness systems—for assignment in other application purposes, e.g. for entertainment systems such as "augmented reality" in the windows or virtual reality on virtual reality glasses in self-driving vehicles. According to embodiments, when a person 10 is automatically detected or assigned to a seat 101, an individualized program for the respective seat 101 can be automatically started. Person A, for whom fashion shopping is particularly important, for example, receives information during the journey about the fashion stores along the way and their offers. A person B who is a sports enthusiast, on the other hand, receives the results of his favorite club.

According to further embodiments, an initial identification can be performed by means of a fast identification procedure (e.g. fingerprint scan or facial recognition) in order to be able to start the systems quickly. This can be, for example, driving a car off, which is, for example, not allowed until a quick identification has been successful. Here, for example, the vehicle-related module 120 may be configured to enable the ignition or door opener only after the personal module 110 has transmitted a message about a successful (quick) identification.

Since even methods that are considered fundamentally secure, such as fingerprint scanning, are not completely safe from attempts at deception, further embodiments allow the user's behavior in the vehicle 200 to be compared (e.g., "how does the user sit in the vehicle," "how often does he change his sitting position," "how does his heart rate and other bio-data change in certain driving situations"). With the previously recorded behavior pattern, the identity can be validated. Behavioral data can also be usage data of media in the vehicle 200. For example, a user 10 may use his account with a social media platform or cloud platforms such as Spotify, etc., under his name. If an account not registered to the user 10 is used, or the usage behavior differs greatly from previous behavior, then this may be an indication of misuse.

The combined analysis of this behavioral data can be used to check or validate the identification. In the case that this reveals, with a certain probability, that the identified user has not been correctly identified and misuse occurs with a certain probability, appropriate security measures can be initiated.

These security measures can be designed very differently according to embodiment examples. Mandatory re-identification using a different method may be an option. If, for example, identification was made with a fingerprint scan, then voice prompting to enter or speak a password or asking security questions can be an option. There are many possible configurations, including automated search for the next parking space and immobilization or securing of the vehicle.

The combination of a vehicle-related module 120 and a personal module 110 (e.g., personal fitness systems) not only enables identification of users 10, but the following describes how this combination of personal fitness systems and in-vehicle bio-management systems increases the quality of data and prediction for reliable identification.

Figure 5A:
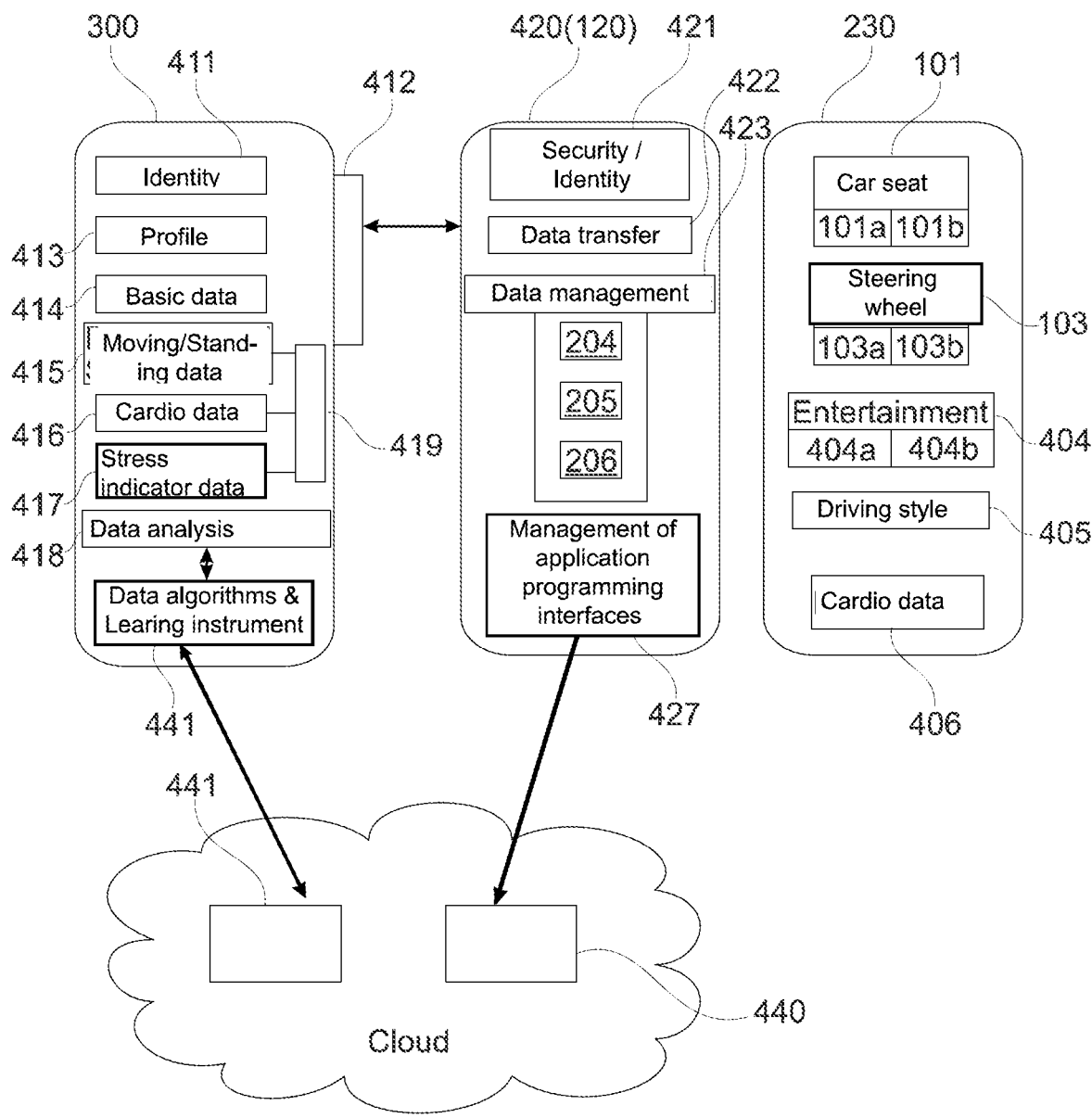
FIG. 5A shows further details of the combination of a vehicle-related module with a personal module according to embodiments.

FIG. 5A shows further details of the basic technical structure of the combination of the vehicle-related module 120 and the mobile device 300 with the personal module 110.

The vehicle-related module 120 may be a separate processor unit for bio-management or a part of the vehicle entertainment, navigation system, or other processor system in the vehicle. However, in a further embodiment, it may also be designed as a secured gateway 420 and comprise the following functional modules: "identity and security function" 421, "data and information transfer to vehicle-external systems" 422, "vehicle-internal data management" 423. However, the design as a gateway is only optional. All the functions mentioned below can also be functions of the vehicle-related module 120 without being designed as a gateway.

As shown in FIG. 3, the data management module 423 includes modules on "data fusion" 204, "data algorithms analysis rules" 205, and "output of information to users and adjustment of vehicle settings" 206.

The wearable device 300 may be a wearable fitness system in which the personal module 110 is implemented (e.g., as an app). Typically there may be multiple personal modules 110 and, accordingly, multiple wearable devices 300 for different occupants of the vehicle 200, which communicate with the vehicle-related module 120.

In particular, the secured exemplary gateway 420 provides the following functions:
1. Prior to a connection of the personal module 110 and the vehicle-related module 120 respectively 420, an identification of the user 10 is performed by the personal module 110 and validated as previously shown.
2. Assignment of seats 101 to users performed and verified.
3. Optimal settings stored in the personal "Optimal settings" module 419 are performed at the start of the journey. Day-specific settings can be calculated that take into account previous activities outside the vehicle, such as sports, etc. The settings are stored in the personal module "Optimal settings".
4. The safety of the information will be ensured. In particular, it will be ensured that no dangerous traffic situations can occur as a result of adjustments in the vehicle (e.g. changing the seat position that makes safe operation impossible).
5. Health-related sensor data generated in the car is analyzed and adjustments are performed to the vehicle as needed.
6. Data generated in the vehicle are analyzed and only aggregated or specifically selected data and information are sent back to the respective wearable fitness systems 300. This saves energy (in the battery) in the personal module 110, and the flow of information between the personal module 110 and the vehicle-related module 120 or 420 can be optimized (lower latency, better use of bandwidth). The bandwidth for transmissions between the personal module 110 and the vehicle-related module 120 can also be optimized to reduce energy consumption.

According to further embodiments, the gateway 420 comprises a "management of application programming interfaces (API)" 427 as a further functional module. This is particularly advantageous when different sensors in the vehicle 200 or wearable fitness systems 300 from different manufacturers should be connected. Generally, this is an application programming interface management system as known to those skilled in the art (often referred to by the acronym API).

The exemplary gateway 420 may control and transfer for instance data and information for all seats 101 and relevant systems in the vehicle 200. In a possible embodiment, the gateway 420 may be formed directly in car seats 101 or on other relevant parts of the vehicle 200 such as transmission units for Bluetooth and mobile communications, etc. Advantageously, in this embodiment, it includes or can access a central unit for identification that can be used for security management and management of external interfaces.

However, the gateway 420 can also be or have an interface to a so-called "CAN (Communication and Accelerated Networks)" unit used in vehicle construction, whereby the data transfer in the car can be secured using various methods such as cryptography. According to embodiments, the gateway 420 within the CAN as a sub-module—as explained—comprises its own protection for the vehicle-related module 120, which controls which data and information is passed on in which form and how, for example, the seats 101 may be adjusted.

The vehicle-related module 120 controls the vehicle components 230 (e.g., systems for adjusting the vehicle) respectively receives information or data from the existing sensor systems (see FIG. 2 or FIG. 3). The systems shown in FIG. 5A need not be combined into a single unit and may be stand-alone systems in their own right that also perform their own calculations and data analysis. According to an embodiment, the vehicle-related module 120 and at least some of the vehicle components 230 are combined together into an integrated overall system. This overall system is characterized by simpler and faster interface design and connectivity, lower latency, and a significant increase in the quality of data analysis.

The following modules may be configured (e.g., in the vehicle components 230 or separately therefrom) for controlling the vehicle components 230. A module for managing 101a the car seats 101 is assigned to the car seat 101. This module receives only the information necessary for it to adjust the seat 101a. However, there may be sensors in the car seat 101 that provide seat data 101b. A steering wheel module is associated with the steering wheel 103, whereby the steering wheel settings 103a can be changed and steering wheel data 103b can be determined. The entertainment system 404 can optionally be controlled as well. Thus, entertainment settings 404a can be changed and entertainment data 404b can be determined. This includes, for example, setting with respect to volume, music style, or key indicators such as beats-per-minute, etc. Driving style settings (e.g., acceleration, chassis settings, etc.) may be changed or captured by module 405. There may also be sensor modules 406 for capturing cardio data, which need no sub-module for managing the settings. And modules for adjustment are also possible, where an analysis of the data offers no or too little benefit (e.g. mirror adjustment).

The wearable fitness system 300 may include the following modules, which may be part of or at least accessible by the personal module 110. The modules include an identity module containing identification information 411, a transmitting and receiving unit 412, and a module 413 containing the user's basic profile or other information about the user that is not directly used for identification but is important for use in the vehicle and for customization of the vehicle. These are data and settings that do not change or change very slowly. Examples can be height, leg length, etc.

Other optional modules in the wearable fitness system relate to basic bio-mechanical data 414 such as step lengths, foot strike and roll, calculated position of the hip (scoliosis), etc. These data can be collected and calculated by the sensors in the mobile device 300. Optionally, a medical analysis in the laboratory or clinic is added here to validate or replace this information. This information can usually only change over time.

Likewise, there may be a module on Bio-Mechanical Behavioral and Status Data 415 such as movement, standing and sitting data, which may relate to the following questions: how often was walking (at what speed, rolling behavior e.g. with different fatigue states, variation in stride length, etc.), sitting, lying or standing. Are the behavior patterns within a certain—rated as normal—range or do they deviate (and how much). What fatigue of the muscles and the user as a whole can be deduced. In a long-term view, these data 415 can also be used to make adjustments to the baseline data 414.

By dividing the vehicle into modules or data pools with different modification possibilities and the user profiles calculated from them, less computing capacity and faster calculations and adjustments of the vehicle are possible. Due to the basic profile 413 and the profiles of the basic biomechanical data 414, a basic adjustment can immediately be made to the seats 101 as soon as the personal module 110 has identified itself. Simultaneously with the identification process, only the biomechanical behavior and status data then need to be analyzed with the then up-to-date data, and the seat setting only needs to be fine-adjusted accordingly. This can reduce latency and energy consumption.

Other optional modules relate to cardiac data 416 such as heart rate, heart variability, ECG data, etc., or to stress indicators 417 resulting, for example, from matching cardiac data with exercise data, temperature, etc. They can also be measured specifically using sensors such as electrical conductivity on the skin. An example is that using appropriate criteria such as heart rate, heart variability, brain waves, the stress level of a user 10 is determined. The more stressed the user 10 is, the more relaxing the suspension setting, driving style (greater distance, slower acceleration in self-driving or partially self-driving systems etc.), more relaxing music (fewer beats, etc.) is selected. According to embodiment examples, less information can be shown or said in the information system in the screens or the "augmented reality" windows, or important navigation instructions are repeated more often and said louder when the driver is tired, etc.

However, separate wearable personal fitness systems for, for example, cardio data and movement, standing and sitting data may be present and used. For example, a system for collecting movement, standing and sitting data from manufacturer A and a system for collecting cardio data from manufacturer B and a sleep tracker from manufacturer C may be used. In this case, the vehicle-related module 120 performs the function of collecting and aggregating the data for use in the vehicle as a central hub. In all separate wearable personal fitness systems, corresponding identity modules 411 are present or the personal fitness systems are coupled to or can access a fitness system with an identity module 411 to perform identity verification.

Therefore, the personal module 110 or mobile device 300 may be the permanent fitness application where all information and data is collected and stored to a sufficient extent. If several different vehicles are used, then this data and information may be combined in the personal module 110. The vehicle-related module 120 or vehicle component 230, on the other hand, only receives information to the extent necessary and only temporarily performs certain tasks that allow for adjustments in the vehicle as well as data collection, merging and data analysis.

Similarly, the vehicle-related module 120 also need not provide all of the data to the personal module 110, but instead analyzes the data using provided data algorithms. The personal module 110 may provide the vehicle-related module 120 with a data analysis instrument 418, wherein the data analysis instrument 418 may inform the vehicle-related module 120 which data is needed and in what form.

For example, the data analysis instrument 418 includes data algorithms for analysis and may be available immediately after linking the personal module 110 and vehicle-related module 120 to analyze a user's data from the personal module 110 and the vehicle-related module 120. The data analysis instrument 418 includes all necessary data algorithms, rules, software, profiles, etc. for operation, but advantageously only to the extent absolutely necessary. As a result, it can send data/results directly from the personal module 110 to the vehicle-related module 120 via the transmission unit 412, if required, and can be used or implemented in the vehicle-related module 120.

Sending from the personal module 110 to the vehicle-related module 120 requires energy, which is often in short supply as a result of the severely limited energy storage in the personal module 110. Embodiments therefore utilize this in the event that a cellular connection from the vehicle to a cloud is not available. On the other hand, if a cloud connection is available, then the process may be as follows. The personal module 110 identifies itself to the vehicle-related module 120, which simultaneously authorizes the vehicle-related module 120 to download the data analysis system 418 or its results from the cloud 440. For this purpose, the personal module 110 informs the vehicle-related module 120, and thus also the cloud, which version it is. This prevents newer versions of the data analysis system 418 from existing in the cloud and the personal module 110 also having to be provided with the latest version, which would result in high energy consumption by the personal module 110 and would also take longer.

According to embodiments, the data algorithm learning instrument 441 further develops existing data algorithms or develops new data algorithms. To further develop new data algorithms, data from many users are analyzed. This separation of the data analysis instrument 418 and the data algorithm learning instrument 441 is an important innovation for the field of machine learning or artificial intelligence in portable or mobile devices according to embodiment examples, since the high additional power consumption by the data algorithm learning instrument 441 can be shifted to times when sufficient resources (e.g., power supply, fast network connectivity) are available.

The present invention is also intended to relate to this aspect, described in more detail below, of dividing data collection, data analysis, and learning by a learning instrument.

The data algorithm learning instrument 441 requires additional and in part very extensive energy. Here, new data algorithms can be developed or existing ones enhanced using artificial intelligence methods. Thereafter, it can be periodically integrated into the data analysis 418. In data analysis 418, the current data algorithms are used to operate the systems; however, this does not require (and therefore need not include) any instruments for learning/further development. This is because these would require additional power and transmission bandwidth, etc., which is not always sufficiently available. Therefore, by splitting data-algorithmlearning instrument 441 and data-analysis 418, only data-analysis 418 can be used at times when resources are limited. The limited resources refer, for example, to available power, available data bandwidth, storage capacity, computational capacity (e.g., a battery-powered vehicle or portable device or only Bluetooth connectivity instead of 5G or wi-fi).

Data algorithm learning instrument 441 is provided to vehicle-related module 120 or secured gateway 420 for temporary use only in this embodiment. The data algorithm learning instrument 441 is secured, i.e., it cannot be read, copied, etc., by the gateway 420. In the following, the gateway 420 may always be the vehicle-related module 120. Temporary storage in the gateway 420 is authorized and managed only by the data algorithm learning instrument 441. This protects the knowledge and know-how residing in the data algorithm learning instrument 441.

This is also generally the case with data analysis 418, although the storage of data analysis 418 in the vehicle-related module 120 may be longer or more permanent. Both systems ensure, via procedures known to the skilled person, that personal data of the user can be used from the portable device 300 into the gateway 420 for analysis by the data analysis 418 and also for further development of the data algorithms by data algorithm learning instrument 441 with vehicle-related data. After this use, this data can be deleted again in the gateway 420. Only absolutely necessary data of the user is selected and played to the device 300 or the cloud associated with the device 300.

This separation of data algorithms (data algorithms learning instrument 441) and analysis in the data analysis module 418 is intended to be an independent aspect of the present invention, which is also applicable in many other fields.

Data algorithms learning instruments 441 can be performed, for example, with data from many users in large data centers (data-volume-effect). For this purpose, data from wearable fitness systems or even vehicles can be transferred to different data centers. However, the present invention requires the need-driven joint analysis of very different data and the question of the according data sovereignty of the private and corresponding bio-data of the respective user arises. The aim is to achieve need-driven joint analysis in an environment in which the available energy and transfer bandwidth fluctuates greatly and is severely limited in some phases.

To take advantage of the data-volume-effect, but still not have to merge all data into one data pool, the following methods are used:

1. In phases with sufficient resources (good battery power and very good transfer bandwidth, e.g. 5G), all or many specifically selected data are transferred to a merged data pool in a data center or there is ongoing data exchange between the vehicle-related module 120 and the cloud 440.
2. The data can be marked (e.g. before a transfer), which identifies the data (e.g. who is the data from or who does it belong to) or whether this data should be deleted after a certain time or after certain analysis processes. This can be a simple additional classification (e.g. a column with names of data owners etc.).
3. In the large, merged data pools, correlations of effects and so-called patterns can be determined using the familiar methods from artificial intelligence. However, since only part of the user data is available, some correlations turn out to be statistically less significant. For these, specific analysis methods can be used and temporarily integrated in the data algorithm learning instrument 441. The data algorithm learning instrument 441 is then selectively transferred to the gateway 420/vehicle-related module 120 at times when there is a good power supply and transfer bandwidth (for example, when charging at home, etc.) and stored there until there is a good power supply and bandwidth again. The data algorithm learning instrument 441 then specifically checks the incoming data for correlations of effects even during times of limited power supply and transfer bandwidth. In this connection only limited data learning is applied, specifically targeted to the case of testing only a portion of the data or only a portion of possible effect relationships.

For this purpose, a module in the gateway 420 periodically senses the transfer bandwidth and power supply of the vehicle and the portable personal devices 300, and accordingly controls the various transfer and analysis methods shown. In FIG. 5A, this exchange/transfer is shown schematically by the double arrows.

Figure 5B:
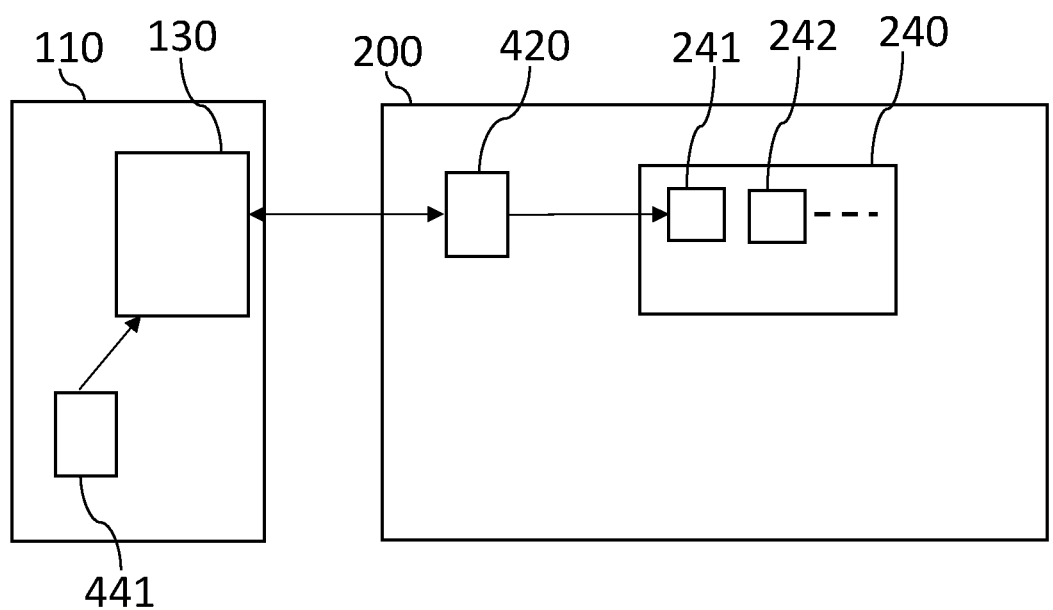
FIG. 5B shows another embodiment example for the data exchange between the vehicle-related module and the personal module.

FIG. 5B shows an embodiment example of how a processor of the personal module 110 transfers the current data algorithm learning instrument 441 to the gateway 420 in the vehicle 200 via the communication module 130. In the gateway 420, the data algorithm learning instrument 441 is authenticated. Here, known methods with pre-registration, "private/public key" encryptions can be used. That means, the manufacturer of the personal module 110 may have reached an agreement with the manufacturer of the vehicle 200 or the vehicle-related module 120 for authentication. In addition, the following may be specified, for example:

1. Which data may be used temporarily—during the time when the user of the personal module 110 is in the car 200—in principle. However, further details or modifications can then be made during use or at another time.
2. Whether and where the data algorithms learning instrument 441 may use temporarily a processor in the car.
3. What rights the data algorithm learning instrument 441 has to control the data streams in the car 200. This may include, for example, regulations regarding what and how much data is processed in the data algorithm learning instrument 441 and how the data algorithm learning instrument 441 may control the data streams or access thereto.
4. Whether and how a cross-data-exchange or compensation (e.g. monetary compensation) takes place for the use of data. Data represents an important raw material for artificial intelligence applications and platforms. Therefore, both the manufacturers of the personal module 110 and the manufacturers of the vehicles or the vehicle-related module 120, as well as the suppliers of the vehicle-related modules 120, consider the data from their products as their property. This can lead to the fact that no joint data pool for conjoint overarching and further analysis can be carried out. The task here is to develop a technically efficient system that enables fast, technically correct and fair acquisition of the data used. For this purpose, embodiments show a technical solution that enables such an allocation in a technically energy-efficient and precise manner.

Accordingly, the gateway 420 stores the data algorithm learning instrument 441 internally for execution on a processor or forwards it to another processor or processing unit. For example, a processor 241 may be used for this purpose to control the "entertainment" unit 240 with the processor 241, buffer 242, other processors, and processing units such as those known to those skilled in the art of artificial intelligence (e.g., "stencil" processors). However, in an embodiment, the data algorithm learning instrument 441 is executed in the personal module 110 and vehicle-related data is sent to the personal module 110 accordingly for this purpose.

The following simplified embodiment example shows how data can be condensed and at the same time anonymized in the present application. For example, the task may be to set or record the driver's heart rate in relation to the difficulty of the route (curves, degree of expansion, condition of the road due to cameras, vibrations, etc.) and to the speed, driving behavior (information from the steering wheel, brake/gas pedal) and the driver's sitting behavior. Transmission of all data to a central server would mean a lot of energy consumption and also a high transmission bandwidth.

Transmission of the driving route would also allow conclusions to be drawn about the whereabouts and could violate the driver's privacy. It is known to the person skilled in the art that, in the case of data algorithms, learning is less about the data and more about statistical ratios such as correlation coefficients. Therefore, it is not necessary or important to pass on difficulty of driving route, speed, and driving behavior in raw data. It may be sufficient to transfer and further analyze the appropriate statistical ratios between the data. This also means that it is not necessary to pass on personalized data such as the exact driving distance. It should be understood that it can vary greatly which indicators are suitable in a specific case.

Thus, an essential component of the data algorithm learning instrument 441 is also a control instrument (e.g., a control module) in the data algorithm learning system 441.

Figure 5C:
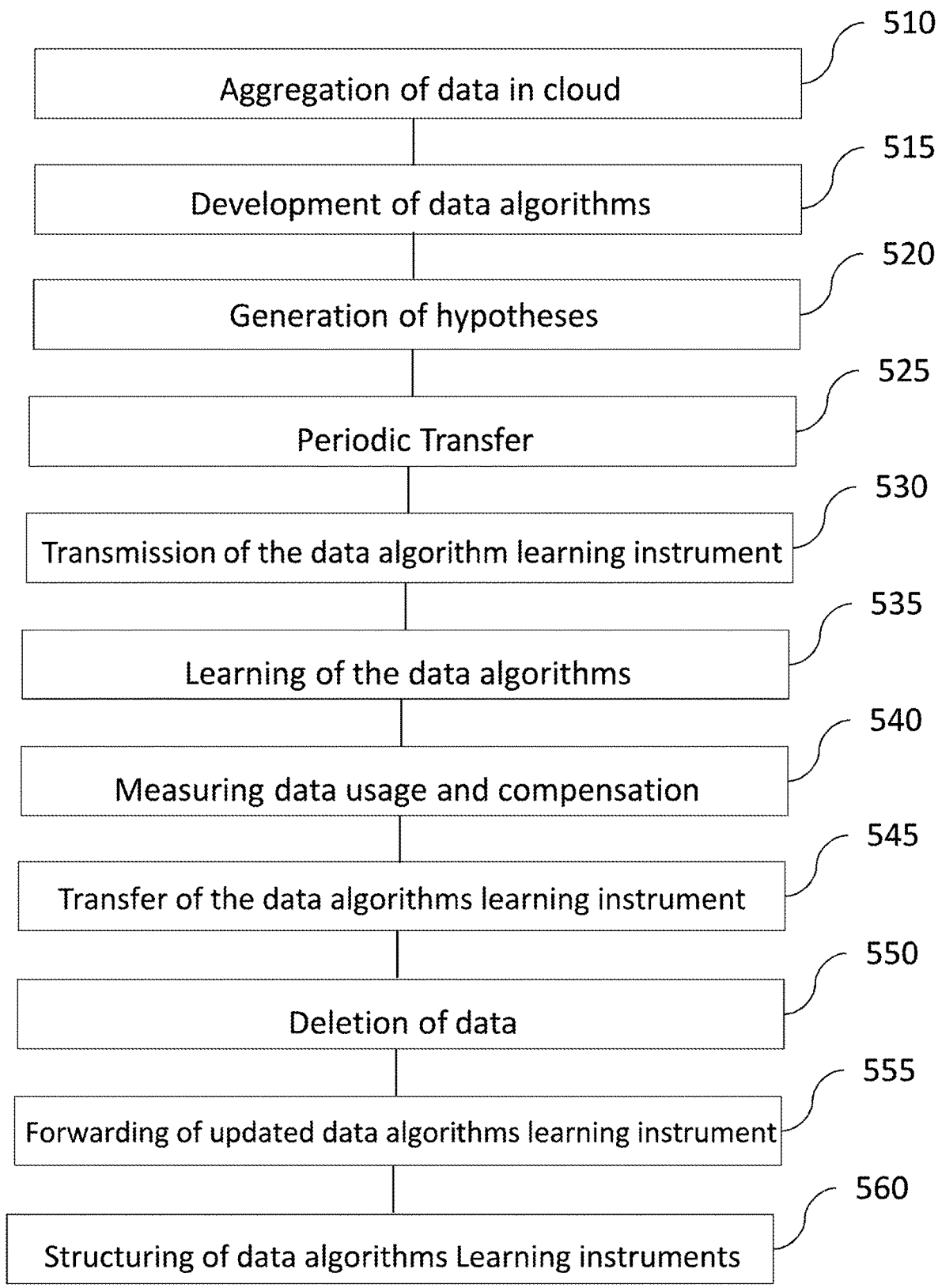
FIG. 5C shows another embodiment example of a method for exchanging data between the personal module and the vehicle-related module.

FIG. 5C shows an embodiment of a method for exchanging data between the personal module 110 and the vehicle-related module 120.

1. Aggregation of data in cloud 510: In a central data center in the cloud, for example, the results of partial analysis of the personal module 110, condensed data, ratios calculated from data, or a portion of the raw data from the personal module 110 are aggregated (this may also include the corresponding data, ratios, and results from the vehicle-related module 120).
2. Development of data algorithms 515: Here, new data algorithms are developed and existing ones are reviewed via procedures known to the skilled person.
3. Generation of hypotheses and assignment of hypotheses to personal modules 110 and usage situations 520: In embodiment examples, a procedure is used to form hypotheses and use them in a way that is appropriate to needs and privacy of users. Users may determine which and to what extent data may be used through their privacy setting in the person-specific module 110. For example, a user can specify that his heart rate data may not be used. This means that certain analysis, such as analyzing heart rate with driving behavior, are not possible.

Another embodiment is that the users in the personal module 110 determine which data in the vehicle-related module 120 may be used and how. This may include the user allowing data use for use in certain applications, but restricting more advanced analysis for the data algorithm learning instrument 441. It may also be that the user specifies that certain vehicle manufacturers are excluded. The personal module 110 transfers privacy settings to the vehicle-related module 120 (only) for the duration of use in the vehicle 200, and also controls data flows according to the specification.

The manufacturers of the vehicles and the suppliers of the components can determine what data of their products and components can be used and how. For example, a manufacturer of car seats with pressure sensors in the seats (to record sitting behavior) may determine with one vehicle manufacturer that all pressure distribution data is provided. With another manufacturer, only whether someone sat in the seat is transmitted, but not the calculated weight, pressure distribution in the seat over time, etc. The reasons for this can be different and range from technical reasons to legal reasons.

In conventional procedures, all data are merged centrally and analyzed there. If data cannot be supplied because the user or a manufacturer does not allow this, data gaps with missing data are created. The data analysis must then first detect these data gaps and neutralize them with methods known to the skilled person or circumvent them. In the method according to embodiments, hypotheses to be analyzed or validated are formed that fit the available data. If, for example, it is determined for a portion of the users that there could be a correlation between pressure on the accelerator and brake pedals and the change of sitting position (for example, on the basis of a correlation coefficient that is in the medium but not significant range), then this can be validated, for example, and a higher statistical reliability can be achieved by specifically checking this correlation for many other users, whereby certain variables can be varied. For example, there is a statistical correlation between sitting position and pressure on accelerator/brake pedal in 40- to 49-year-old women, but not in other age groups or in men.

According to further embodiments, the user group that has consented to the analysis of heart rates is specifically analyzed. For this group, heart rate, gas/brake pedal, age, gender, etc. are then included and statistical ratios are created and an algorithm is developed. This algorithm is then tested on other user groups that do not have their heart rate analyzed. Here, for example, the algorithm can simulate the consideration of the heart rate based on the previous analysis with probabilities and ranges and further develop the algorithm accordingly.
4. Periodic transfer 525 of the generated hypotheses and the data algorithms learning module to the personal module 110: A user with a restrictive privacy setting only receives the corresponding hypotheses and data algorithms on the personal module 110. If he uses only one car brand with specific supplier parts, only the corresponding hypotheses are uploaded. If he uses very different vehicles or vehicles that differ greatly in components, then he gets the hypotheses for all these components or vehicles. According to embodiment examples, users, the personal module 110, the vehicles and their components are identified or validated by an identification system—which is accessible to the various manufacturers. However, encryption technologies can also be used for this. These are known to the person skilled in the art (e.g. symmetrical or asymmetrical, i.e. combination "private key"/"public key").
5. Transmission 530 of the data algorithm learning instrument 441 to the vehicle 200 during use of the vehicle: according to embodiments, the data algorithm learning instrument 441 is transmitted after identification during use in the vehicle 200, checked in the gateway 420, and accordingly assigned to scheduled processor units in the vehicle. There, it uses the temporarily provided processor to control all required authenticated data. Here, the safeguarding mechanisms known to the skilled person such as sandboxing, containerization, layering, etc. are used. The data algorithm learning instrument 441 must not have unauthorized access to the critical systems in the vehicle 200. Conversely, the knowledge and know-how of the data algorithm learning instrument 441 is protected from unauthorized access by the vehicle.

6. Learning 535 the data algorithms: This tests the hypotheses generated and transferred to the vehicle 200 and develops the data algorithms or parts of them further.

Figure 5D:
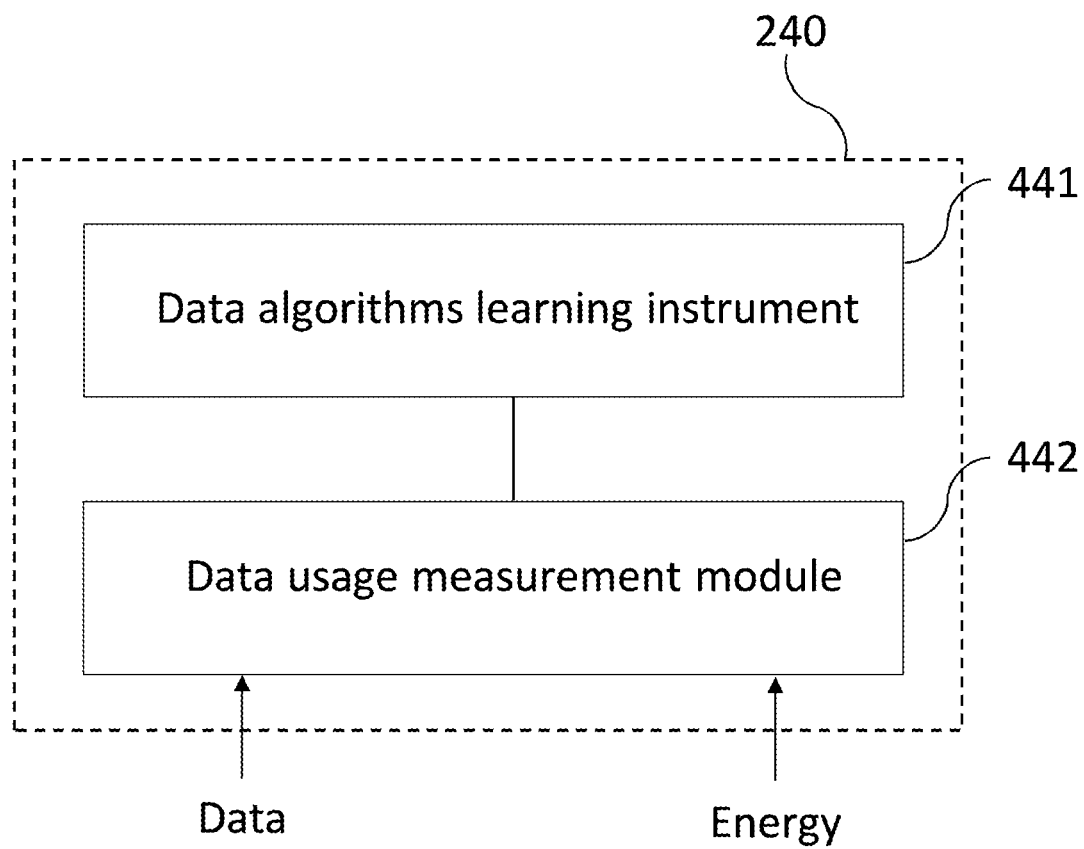
FIG. 5D shows another embodiment example of coupling the data algorithm learning instrument to a measurement instrument for detecting data usage.

7. Measuring 540 data usage and compensation: As shown, measuring data usage is part of the technical task. This is described below and the technical solution is shown in FIG. 5D. Monetary values can be used for compensation. However, the introduction of a separate virtual currency accepted by all producers (e.g. tokens as known from the blockchain area) is more productive.

8. Transfer 545 of the data algorithms learning instrument 441 with the results back to the person-based module 110.

9. Deletion 550 of all data, data algorithms of the data algorithm learning instrument 441 and their computational operations (with intermediate results, temporary outsourced computational operation as known from the field of neural learning): The processor and memory capacities in the vehicle-related module 120 made available to the personal module 110 are cleared again (they are deleted and thus "cleaned") and thereafter made free for the vehicle-related module 120.

10. Forwarding 555 of the updated data algorithms learning instrument 441 to the cloud of the manufacturer of the personal module 110: The data algorithms learning instrument 441 is sent to the central cloud during the next communication. This may be a multi-partner cloud operated by multiple partners, but a neutral platform that protects the privacy of the user of the personal module 110 in the defined manner and extent.

11. Structuring 560 of the various data algorithms Learning instruments 441 in the central cloud according to the defined structure: Here, specific analysis is carried out to determine the areas in which deviations exist. From this, new working hypotheses are established, which are tested in further iterative steps. For example, a simplified example is: In a data algorithm learning instrument 441 of user A, a statistical correlation is determined, but it is not yet statistically significant and has a still comparatively low confidence probability. In the next iteration, users B, C, D, E, F, etc. —who are similar or identical to user A in some characteristics (for example, same age category, same height category, similar fitness status, etc.)—are therefore targeted and tested for working hypotheses on the statistical correlations (which were present, but not significant in user A).

The method presented can be described as a decentralized-centralized-iterative learning method. This method according to the invention offers the technical advantage that less data has to be transmitted, energy is saved—which plays an enormously important role especially in portable devices such as the personal module 110—and the limited bandwidths of data transmission are used in an optimized way. Due to the iterations, learning and further developing the data algorithms may take a little longer. However, the iterations and validations make the validity and interdependencies more reliable.

FIG. 5D shows an example embodiment of coupling the data algorithm learning instrument 441 to a data usage measurement module 442. This measurement may be performed, for example, by the following methods:

(1) Measurement of the volume of data requested by the data analysis learning instrument 441 and provided by the vehicle-related module 120 or its components (such as a car seat). Detailed analysis regarding data quality may also be performed here. For example, the volume in bytes from the pressure sensors in the seats, the data from the accelerator pedal can be measured.

(2) Measuring the energy consumption of the processor capacities temporarily provided by the vehicle-related module 120 to the personal module 110—in particular for the data algorithm learning instrument 441. Here, the data volume is not measured as in step (1), but only the energy consumption of the processor unit provided is measured. Thus, a statement about the amount of data volume can be made indirectly. However, in general the measurement accuracy is better according to step (1). However, it offers a sufficiently high quality for determining the data volume in combination with what is made of the data. It has the additional advantage that energy consumption can be optimized according to demand (e.g., via a cost function), which plays a major role in electric cars, for example. If, for example, the driver enters a destination into the navigation device with a distance of 400 km, then he needs all the energy for the trip and the price for the energy supply of the processor and memory capacities provided for the data algorithm learning instrument 441 should increase or, in the extreme case, no capacities should be provided. However, if the driver only enters a destination with a distance of 50 km (and, if necessary, confirms that he or she will not continue driving afterwards and that the battery will be charged), then the price for the energy supply can decrease. This approach can thus also improve the technical range of the vehicle or precisely an additional application can be carried out in line with energy requirements.

(3) Combination of step (1) and step (2): Especially if different manufacturers supply data to the data algorithms learning instrument 441. In addition, the energy consumption is measured. If extensive, energy-intensive calculations take place, then there is more reward (in terms of the cost function) for the supplied data. The remuneration can then be divided among the manufacturers according to the supply or provision.

Figure 6:
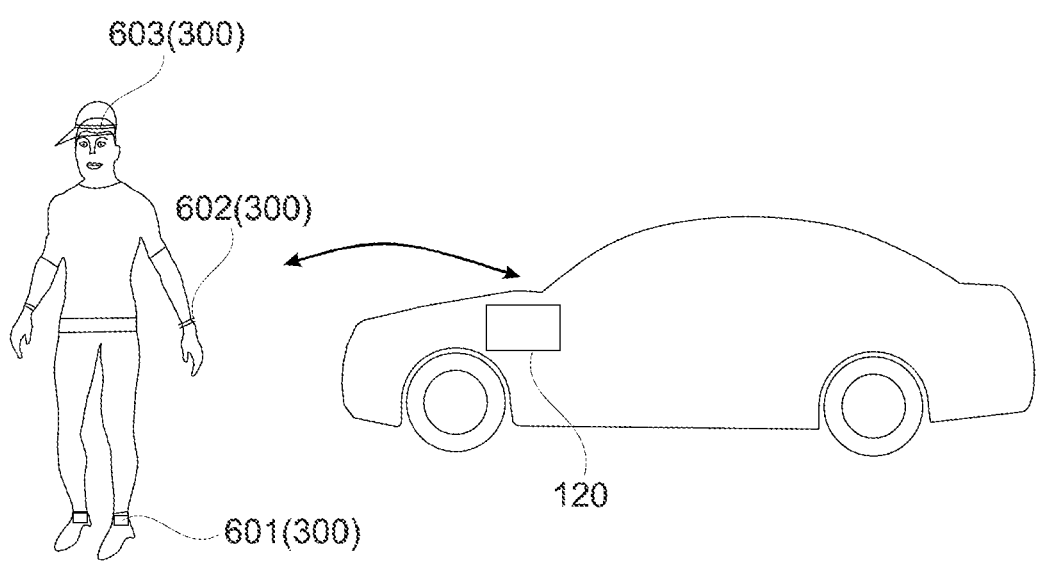
FIG. 6 shows another embodiment example for a mobile device, which is a portable personal fitness system according to embodiment examples.

FIG. 6 illustrates another embodiment of a mobile device 300 comprising, according to embodiments, a wearable personal fitness system for early detection of approaching strokes and fainting conditions. The same hardware, with modified software and data algorithms, can also be used to determine the particular health condition present in diseases such as stroke or Alzheimer's or Parkinson's disease. In these diseases, health states of a person vary widely over time. The 300 device can predict or record the condition, but also the progression of these diseases.

For example, the mobile device 300 includes a motion analysis instrument 601 on the feet to detect tremors in the legs or a change in foot motion. Since tremors in the feet often occur prior to a stroke, an approaching stroke can be detected early and reliably. Rescue workers can then be informed at an early stage so that any damage that occurs in the event of a stroke is less severe or can even be avoided completely.

In Parkinson's, Alzheimer's or epilepsy, the movements change when walking, the gait becomes wider, less symmetrical, etc. Therefore, the use of sensors on the feet, legs or arms is also important here. For reliable diagnosis of an approaching stroke, condition diagnosis in Alzheimer's or Parkinson's disease, a combined use of different sensors is useful. According to embodiment examples, the mobile device 300 therefore comprises, for example, a portable heart analysis system 602 that determines heart rate and variability and, if possible, can also generate an ECG. Also possible is an additional combination with a wearable sensor system 603 that measures brain waves. This may, for example, be integrated into headgear (e.g., a baseball cap). Combined data analysis of the various sensors (e.g., in the heart analysis system 602) can provide a diagnosis with a high degree of probability.

One aspect of the present invention also relates to a standalone sensor arrangement comprising a foot sensor 601 and a heart analysis system 602. Optionally, a sensor capable of sensing brain activity may also be present in this sensor arrangement. This sensor arrangement may provide the same functions as described in the context of the other embodiments for the mobile device 300, but does not necessarily couple to a vehicle-related module 120.

The wearable fitness system 300 may be used to detect whether a deterioration in driving ability has occurred. For patients where the system detects signs of an approaching stroke, Parkinson's disease, Alzheimer's disease, etc. on the way to the car, according to embodiments, the car may be set to self-driving mode or the user may be prevented from starting the drive systems. Therefore, according to embodiments, as soon as the system detects that the user is unable to drive due to health limitations or serious conditions, the system can switch to fully autonomous driving mode and move to the next safe parking location and optionally notify emergency responders or caregivers.

By automatically combining data from the portable components 601, 602, and 603 of the mobile device 300 with data from the vehicle-related module 120 (e.g., driving style data, camera analysis, etc.), the prediction quality of the calculations can be significantly increased. Most importantly, embodiment examples can speed up time-critical technical processes. In societies with many elderly people, this can still ensure mobility without increasing safety risks for uninvolved third parties. This is a major advantage, especially in rural areas.

Figure 7A:
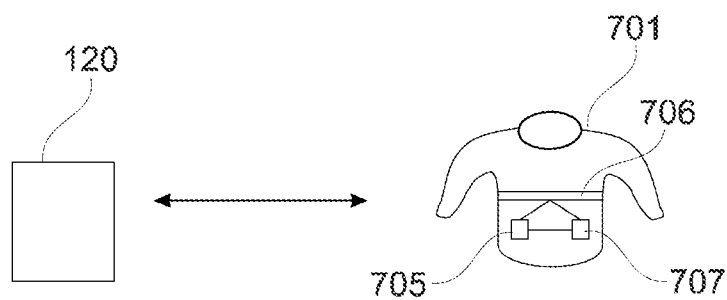
FIGS. 7A, 7B illustrate further embodiments in which a sensor system is provided on a user's clothing.
Figure 7B:
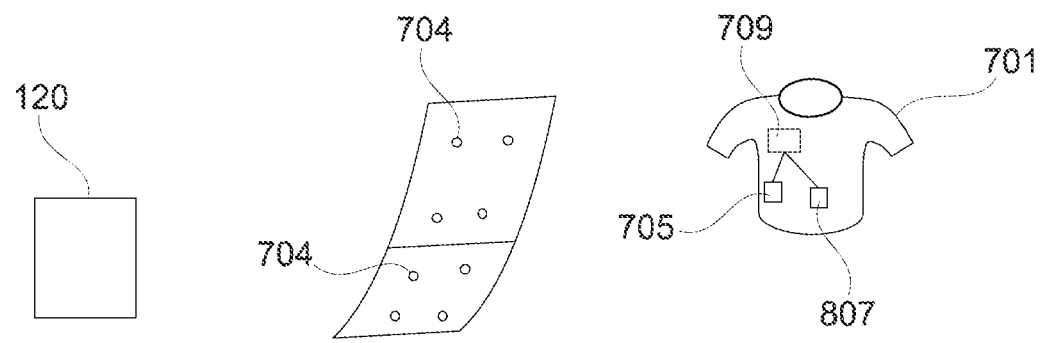

FIGS. 7A, 7B illustrate further embodiments in which a sensor system is provided on a garment 701 of the user.

FIG. 7A shows the case where the sensor system in the garment 701 communicates with the vehicle-related module 120—without direct reference to the car seat—while FIG. 7B shows the case where car seat 101 is integrated in the communication. According to embodiments, the sensor system in the garment 701 can measure various parameters such as heart rate (sensor 706) and transmits this to the vehicle-related module 120 by means of a transfer unit 705 through wireless technologies such as Bluetooth. Optionally, a power supply 707 for the sensors, data transfer, etc. is provided.

FIG. 7B shows an embodiment example with a vehicle seat 101 comprising, for example, contact points 704 with which the body comes into contact, regardless of the sitting position. The user's garment 701 can be supplied with energy via these contact points 704, the garment 701 having corresponding contact points or contact surfaces 709, for example on a rear side, for this purpose. Data exchange is also possible via these couplings. Further embodiments thus also relate to a garment 701 having the aforementioned features (contact areas 709, energy supply 707, transfer unit 705, etc.).

The sensors in or on the garment 701 may include, for example, sensors for pressure measurement, heart rate or ECG measurement, electrical conductivity (for example, to determine muscle activity, perspiration, stress levels, etc.), temperature, etc.

According to further embodiments, the garment 701 may also include mechanical and electrical elements for massage, heating or cooling, or electrical stimulation. As a result, muscle areas can be relaxed, exercised or the temperature directly on the skin can be optimized specifically for certain areas of the body. Time spent in the car can therefore also be used specifically for medical or physiotherapeutic measures.

Embodiments not only provide a fast and technically efficient additional power supply (an energy storage device in the garment may also be charged), but also enable an energy-efficient and fast data exchange between the vehicle-related module 120 and the garment 701.

The 706 portable cardio system can permanently analyze heart activity. The heart activities can fluctuate also without any health problems. Moreover, these fluctuations can vary greatly from person to person. Optionally, another system can be present in the shoes or on the legs to permanently record biodata (heart rates, blood pressure, etc.) there as well.

Figure 8:
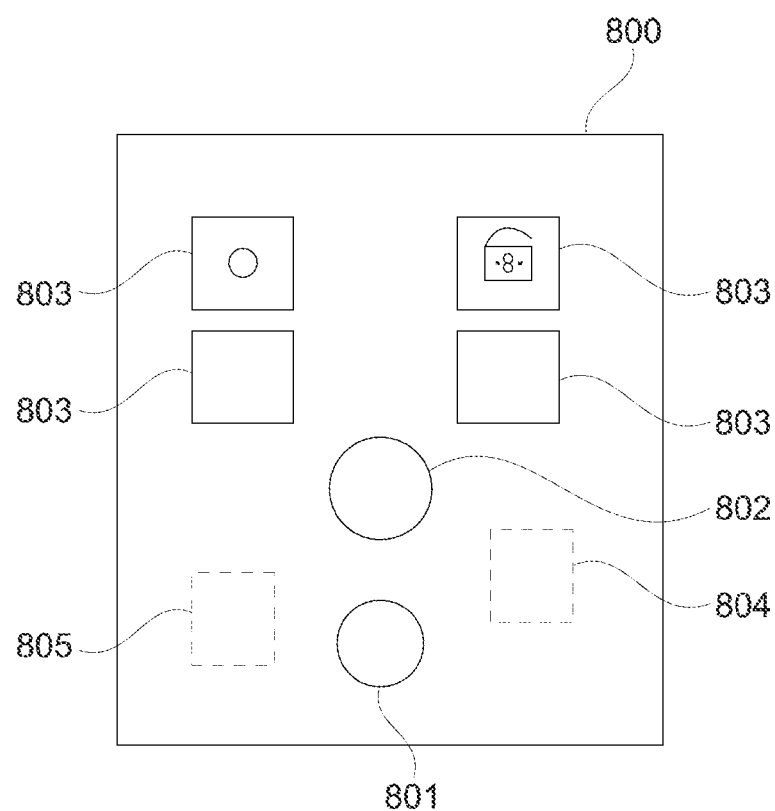
FIG. 8 shows an example of a personal, portable identification system.

FIG. 8 shows an embodiment example of a personal wearable identification system 800 comprising a fingerprint scanner 801, eye-iris scanner 802, input keys 803, spatial position recognition sensors such as GPS 804, accelerators, and gyroscopes 805. This system may also be housed in other mobile devices 300 such as watches, phones, remote controls, eyeglasses, or clothing. According to embodiments, this system 800 may also include the personal module 110 (e.g., in a control unit).

Fingerprint or eye iris scanning by the 802 scanner can be used to identify and authorize the person. Since these security methods can also be manipulated, additional security and plausibility checks can be performed. By jointly analyzing the data from the gyroscopes and accelerators 805, as well as the input keys 803, it can be determined whether the user's carrying and usage behavior exhibits his or her typical usage behavior.

This identification system 800 can therefore not only validate the identity of the user, but also determine whether the user is capable of driving a vehicle. In the case of elevated alcohol levels or drug ingestion, the usage and carrying behavior deviates significantly from normal behavior. This can also be the case with diseases such as Parkinson's or Alzheimer's. Deviations from a defined normal range would correspondingly lead to the user identifying positively, but not being authorized by the system to drive the vehicle. For this purpose, the personal module 110 in the identification system 800 may send a corresponding information or instruction to the vehicle-related module 120.

In further embodiments, however, this method can also be used for other areas such as operating room access, operation of machines, submission of buy or sell offers at stock exchanges, ordering processes, etc.

By combining identity verification with behavior-based authorization, the technical processing/processes are advantageously accelerated considerably and exhibit higher security.

Advantageous aspects of embodiments may be summarized as follows: A technical arrangement of a comprehensive (bio-) management system in the vehicle not only collects data, but also changes the settings in the vehicle as needed and initiates measures that lead to a healthier stay— and especially sitting—in the vehicle.

The described in-vehicle management system can be automatically coupled quickly with various fitness systems via the technical architecture underlying embodiment examples, with high data and privacy security being achieved by the technical design. This is not intended to be an additional encryption technology, but a new technical architecture that enables so-called security "by design".

Embodiments provide not only more security and a faster technical connection setup, but a technically optimized data exchange between personal health and fitness systems and bio-management systems in the vehicle in terms of transmission rate, volume, etc. This results in lower latency. In addition, battery capacity or energy is saved for the portable personal health and fitness systems and also the bio-management systems in the vehicle.

Many road accidents are caused by sudden onset health problems with partial or complete inability to drive, such as heart attack, stroke, etc. With the significant increase in the average age in many countries, these sudden health problems are increasing. Even with partially or fully self-driving cars, there has not yet been an on-demand response. Because health problems are likely to cause the driver's feet to slide off the gas pedal, the car rolls out slowly, but there is no cause-related and targeted braking action and search for the shoulder or the next parking space and an immediate alert to the emergency call center as needed. Examples of embodiments enable an integrated fitness system to detect such sudden health problems and control the car as needed.

Further advantages of embodiments relate to the following aspects:

The mobile device 300 with the personal module 110 enables "Identity Management as a Service (IDaaS)".

A "Connected Fitness" in the vehicle is implemented, even without a mobile device—e.g. by continuously monitoring the driver while driving. Changes in (health) status can be responded to immediately. The best sitting position can be determined and also changed specifically while driving.

An exchange with external systems allows a division of labor or continuous optimization.

Identity management for sitting positions is enabled.

An efficient interactive data exchange is implemented through demonstrated architecture.

The architecture and processes for data security remains with connected fitness in the car; the personal data on wearable personal devices. This provides a clear arrangement in terms of security and privacy.

The features of the invention disclosed in the description, the claims and the figures may be essential to the realization of the invention either individually or in any combination.

The invention claimed is:

1. A management system for identification and bio-monitoring of at least one user of a vehicle having a personal module configured to access personal data of the user and thereby to identify the user, the management system comprising:

a vehicle-related module configured to access at least one vehicle component, wherein the vehicle-related module is in or on the vehicle, is fixedly connected to the vehicle and is configured as part of a control unit; and a communication system configured to enable a direct exchange of data between the personal module and the vehicle-related module, even when the personal module is outside the vehicle, wherein the vehicle-related module is configured to make or to allow at least one change to the at least one vehicle component based on the exchanged data, wherein the vehicle-related module stores user-specific data only during inter-connection with the personal module and deletes the user-specific data after a pre-determined period of time after the inter-connection ends, and wherein the bio-monitoring is performed within the vehicle and the personal module is implemented in a wearable device and the vehicle-related module is formed as a secure gateway to further evaluate data generated in the vehicle and to return only aggregated or specifically selected data and information to the wearable device, wherein the personal module is configured to store a data algorithm learning instrument, and the vehicle-related module is configured to temporarily receive the data algorithm learning instrument from the personal module, the data algorithm learning instrument including a control device to perform the following in the vehicle-related module:

hypothesize and correlate user state changes with vehicle controls made, test previously-established hypotheses related to at least one other user stored in the data algorithm learning instrument to the user of the vehicle, transfer the hypotheses or the data algorithm learning instrument to the personal module, wherein, dependent on user settings, only the hypotheses and the data algorithm learning instrument are transferred to the personal module, and wherein the personal module is configurable to pass only statistical ratios such as correlation coefficients to a central server, but no personalized data.

2. The management system of claim 1, wherein the vehicle comprises one or more sensors capable of detecting a condition or movement of the user in the vehicle, and wherein the vehicle-related module is further configured to access the one or more sensors to obtain and process information about the condition or the movement of the user to determine at least one of the following:

a use of a particular seat,
an adjustment of the seat,
a change in a state of fitness,
a health deterioration,
a fatigue,
a confirmation of a result obtained elsewhere.

3. The management system according to claim 2, which further comprises an analysis unit or is designed to access an external analysis unit in the vehicle or on the mobile device or an external server in order to aggregate and analyze user-related data, wherein the communication system is particularly designed to transmit data to the external analysis unit via a secured gateway.

4. The management system according to claim 1, wherein the at least one vehicle component is one or more of the following components or a part thereof:

a door opener,
an ignition,
an image display device, an acceleration control of the vehicle,
a braking system of the vehicle,
a communication, navigation or entertainment system,
a seat adjustment module,
a steering wheel adjustment module,
a mirror adjustment module,
a temperature control module, and
a massage unit.

5. The management system according to claim 1, wherein the vehicle-related module is configured to provide an authentication signal to the vehicle to enable access to the vehicle component or to the entire vehicle only when the user has been identified or when the user is in an assigned location.

6. The management system of claim 1, wherein the vehicle-related module is configured to communicate with a plurality of personal modules and to make functions of the vehicle accessible.

7. The management system according to claim 1, wherein the vehicle-related module is configured to implement at least one of the following in the vehicle-related module:
gather user-related data during a ride,
delete all data and the data algorithm learning instrument from the gateway when the user leaves the vehicle.

8. The management system according to claim 1, wherein the vehicle is an electric vehicle and the vehicle-related module is configured to perform an optimization with respect to an energy consumption based on a cost function,
wherein the optimization is performed based on at least one of the following parameters:
energy consumption of a processor,
a measured or indirectly determined volume of data used in a data algorithm learning instrument,
a distance to be driven, and
positive or negative cost parameters such as tokens for previous charges or conservation of resources.

9. A management system according to claim 1, wherein personal module includes a data analysis instrument and a data algorithm learning instrument, wherein the data analysis instrument is configured to analyze the data based on data algorithms, and the data algorithm learning instrument is configured to further develop the data algorithms based on a machine learning process or to develop new data algorithms based on utilization of artificial intelligence, and
wherein the vehicle-related module is configured to receive the data algorithms from the personal module and to perform an evaluation of the data based thereon.

10. The management system according to claim 1, wherein the personal module is configured to allow collected or aggregated data to be transferred to the vehicle or a third party in exchange of receiving at least one token representing a value of the transferred data.

11. A vehicle comprising a management system according to claim 1.

12. The vehicle of claim 11, wherein the vehicle comprises at least one of the following sensors as data source(s) for the management system:
one or more cameras,
at least one pressure sensor in a vehicle seat,
a thermometer,
at least one motion detection sensor,
an ultrasonic sensor,
an infrared sensor,
a microphone,
a device for measuring bio-data, in particular an EEG/ECG,
a force sensor,
an acceleration sensor,
a moisture meter, and
a conductivity measuring device.

13. A system for identifying and bio-monitoring at least one user of a vehicle, the system comprising:
a personal module configured to access personal data of the user and thereby identify the user; and
a management system for identification and bio-monitoring of the at least one user of the vehicle having the personal module, the management system comprising:
a vehicle-related module configured to access at least one vehicle component, wherein the vehicle-related module is in or on the vehicle, is fixedly connected to the vehicle and is configured as part of a control unit; and
a communication system configured to enable a direct exchange of data between the personal module and the vehicle-related module, even when the personal module is outside the vehicle,
wherein the vehicle-related module is configured to make or to allow at least one change to the at least one vehicle component based on the exchanged data,
wherein the personal module is configured to store a data algorithm learning instrument, and the vehicle-related module is configured to temporarily receive the data algorithm learning instrument from the personal module,
the data algorithm learning instrument including a control device to perform the following in the vehicle-related module:
hypothesize and correlate user state changes with vehicle controls made,
test previously established hypotheses related to at least one other user stored in the data algorithm learning instrument to the user of the vehicle,
transfer the hypotheses or the data algorithm learning instrument to the personal module,
wherein, dependent on user-settings, only the hypotheses and the data algorithm learning instrument are transferred to the personal module,
and wherein the personal module is configurable to pass only statistical ratios such as correlation coefficients to a central server, but no personalized data.

14. The system according to claim 13,
wherein the personal module is a portable device or a portion thereof, and the personal data comprises at least one of the following:
a password,
a fingerprint,
an image,
an eye iris scan,
a characteristic cardiac activity,
a heart rate,
a component or property of blood,
a temperature, and
a location information.

15. The system according to claim 13,
wherein the personal module is configured to collect health-specific data of the user and to provide information about potential health deteriorations that may affect driving ability as data for exchange.

16. The system according to claim 13,
wherein the communication system is configured to use at least one of the following protocols: Bluetooth, ANT+, NFC, WiFi, and wherein the communication system is further configured to monitor the communication and detect a non-authorized intrusion by a third party.

17. A method for identification and bio-monitoring in vehicles, comprising the following steps:
gathering of personal data of a user by a personal module, identifying the user based on the personal data gathered;
controlling at least one vehicle component by a vehicle-related module, wherein the vehicle-related module is in or on the vehicle, is fixedly connected to the vehicle and is configured as part of a control unit,
exchanging data between the personal module and the vehicle-related module, independently whether the user is in the vehicle or outside the vehicle; and
performing changes to the at least one vehicle component based on the exchanged data by the vehicle-related module,
wherein the vehicle-related module is configured as a secure gateway and further performs the following steps:
storing user-specific data only during a communication with the personal module; and
deleting the user-specific data after a predetermined period of time after termination of the communication,
wherein data accumulated in the vehicle is evaluated and only aggregated or specifically selected data and information is sent back to the wearable device,
wherein the personal module stores a data algorithm learning instrument, and the vehicle-related module temporarily receives the data algorithm learning instrument from the personal module,
the data algorithm learning instrument includes a control device to perform the following in the vehicle-related module:
hypothesize and correlate user state changes with vehicle controls made,
test previously established hypotheses related to at least one other user stored in the data algorithm learning instrument to the user of the vehicle,
transfer the hypotheses or the data algorithm learning instrument to the personal module,
wherein, dependent on user-settings, only the hypotheses and the data algorithm learning instrument are transferred to the personal module,
and wherein the personal module is configurable to pass only statistical ratios such as correlation coefficients to a central server, but no personalized data.

18. The method according to claim 17, further comprising the step of allowing transfer of collected or aggregated data to the vehicle or a third party in exchange for receiving at least one token representing a value of the transferred data.

19. A non-transitory computer-readable media having software stored thereon configured to perform the method of claim 17 when the software is executed on a data processing unit.

* * * * *